United States Patent
Ducreux et al.

(10) Patent No.: US 9,527,592 B2
(45) Date of Patent: Dec. 27, 2016

(54) HIGH END BUSINESS CLASS CABIN ARRANGEMENT

(71) Applicant: Zodiac Seats France, Issoudun (FR)

(72) Inventors: Christophe Ducreux, Issoudun (FR); Charles Ehrmann, Issoudun (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 14/413,089

(22) PCT Filed: Jul. 8, 2013

(86) PCT No.: PCT/IB2013/055580
§ 371 (c)(1),
(2) Date: Jan. 6, 2015

(87) PCT Pub. No.: WO2014/006607
PCT Pub. Date: Jan. 9, 2014

(65) Prior Publication Data
US 2015/0166182 A1    Jun. 18, 2015

Related U.S. Application Data

(60) Provisional application No. 61/668,515, filed on Jul. 6, 2012.

(51) Int. Cl.
*B64D 11/06*    (2006.01)

(52) U.S. Cl.
CPC ........... *B64D 11/0601* (2014.12); *B64D 11/06* (2013.01); *B64D 11/064* (2014.12);
(Continued)

(58) Field of Classification Search
CPC ............... B64D 11/0601; B64D 11/064; B64D 11/0606; B64D 11/06; B64D 11/0604; B64D 11/0641
See application file for complete search history.

(56) References Cited

U.S. PATENT DOCUMENTS 6,209,956 B1    4/2001   Dryburgh et al.
D724,331 S  *   3/2015   Rajasingham ................. D6/356
(Continued)

FOREIGN PATENT DOCUMENTS

FR    2953168 A1     6/2011
WO    2007124398 A2  11/2007
WO    2009120308 A2  10/2009

OTHER PUBLICATIONS

International Patent Application No. PCT/IB2013/055580, International Preliminary Report on Patentability dated Jan. 15, 2015.
(Continued)

*Primary Examiner* — Valentina Xavier
(74) *Attorney, Agent, or Firm* — Kilpatrick Townsend & Stockton LLP; Dean W. Russell; Eben D. Allen

(57) ABSTRACT

A passenger accommodation assembly for a passenger vehicle can be configured as a column oriented parallel to an axis defining a forward and a backward direction. The column can include at least a second seat positioned behind a first seat. The first and second seats can each be oriented to face toward the axis in directions not substantially parallel to the axis and can each be convertible by a relative movement of elements of the seat between a sitting mode and a bed mode in which elements of the seat form at least part of a sleeping surface. When in the bed mode, the second sleeping surface can be situated higher or lower than the first sleeping surface such that at least a portion of the second sleeping surface vertically overlaps with at least a portion of the first sleeping surface.

14 Claims, 18 Drawing Sheets

(52) U.S. Cl.
CPC ...... *B64D 11/0604* (2014.12); *B64D 11/0606* (2014.12); *B64D 11/0641* (2014.12)

(56) References Cited

U.S. PATENT DOCUMENTS

| | | | |
|---|---|---|---|
| D733,442 S * | 7/2015 | Dryburgh | D6/356 |
| 2009/0243352 A1 | 10/2009 | Cailleteau | |
| 2010/0308164 A1 | 12/2010 | Mckeever | |
| 2012/0223186 A1* | 9/2012 | Henshaw | B64D 11/06 244/118.6 |
| 2012/0292957 A1* | 11/2012 | Vergnaud | B64D 11/06 297/188.08 |
| 2013/0106156 A1* | 5/2013 | Orson | B64D 11/06 297/217.3 |
| 2014/0306500 A1* | 10/2014 | Dryburgh | B64D 11/06 297/232 |
| 2016/0016667 A1* | 1/2016 | Schmidt-Schaffer | B64D 11/0641 244/118.6 |

OTHER PUBLICATIONS

International Patent Application No. PCT/IB2013/055580, International Search Report and Written Opinion dated Jan. 16, 2014.

* cited by examiner

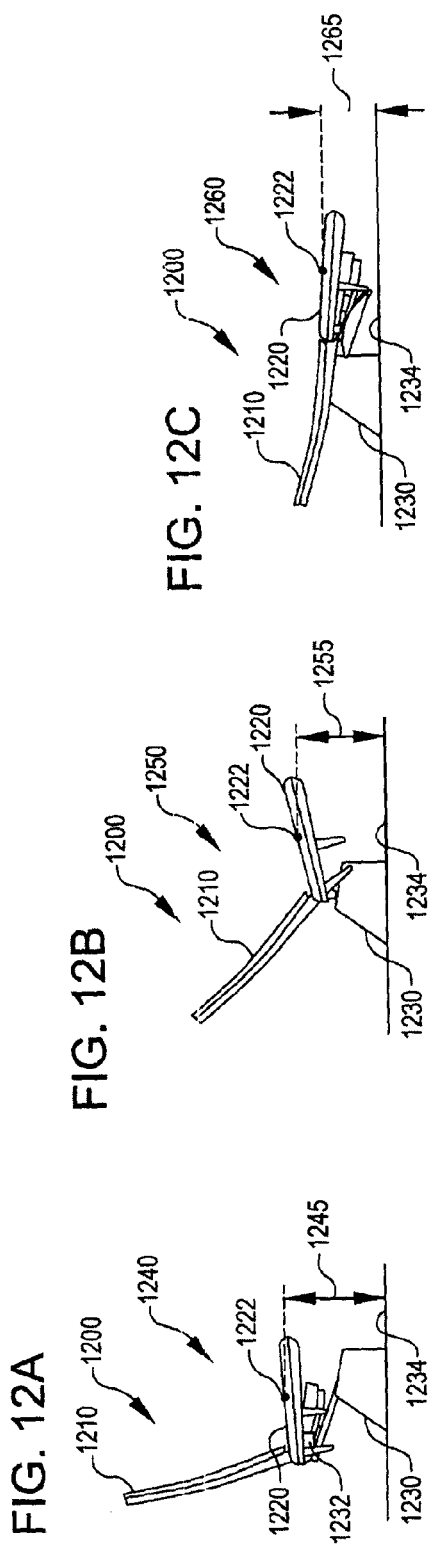

HIGH END BUSINESS CLASS CABIN ARRANGEMENT

CROSS-REFERENCES TO RELATED APPLICATIONS

This application is the U.S. national phase entry of International Application No. PCT/IB2013/055580, entitled "HIGH END BUSINESS CLASS CABIN ARRANGEMENT," filed Jul. 8, 2013, which application claims the benefit of U.S. Provisional Application No. 61/668,515, entitled "HIGH END BUSINESS CLASS CABIN ARRANGEMENT," filed Jul. 6, 2012, the entire disclosures of which are hereby incorporated herein by reference.

TECHNICAL FIELD

Disclosure herein relates to accommodations for passengers aboard passenger vehicles, and more particularly to arrangements of passenger seats and sleeping surfaces within an aircraft.

BACKGROUND OF THE INVENTION

Passenger aircraft routinely fly non-stop routes that involve flights lasting over ten hours and/or occurring during late night hours when the passengers would normally be sleeping. As such, passengers frequently wish to sleep for short periods or extended portions of the flight. Generally, such aircraft are equipped at minimum with seats capable of some level reclining so as to accommodate passengers wishing to sleep. More luxurious "sleeper seats" may also be provided, which in some cases recline as far as to allow the passenger to reach a prone or nearly prone position, or in other instances may be converted through the rearranging and/or adding of components to form a bed-like horizontal sleeping surface. However, when compared to conventional seats having minimal reclining capability, these sleeper seats require more significant allotments of space aboard the aircraft due to the larger footprint of the "sleeper" configuration.

Furthermore, as shown in FIG. 1, aircraft seats 130 are traditionally arranged in rows 120 of seats 130 which face forward in the cabin, parallel to a longitudinal axis 140 of the aircraft. Rows 120 are usually divided into smaller lateral groups of seats 130 by one or more aisles 150 proceeding forward through the cabin. As a result, in many seating configurations, many passengers (e.g., in seats 130*a*, 130*d*, 130*e*, and 130*h*) do not have direct access to the aisle (such as may be necessary, for example, to visit the lavatory), but must cross in front of one or more adjacent passengers' seats in order to reach the aisle (e.g., a passenger in seat 130*e* must either cross in front of seat 130*f* or both of 130*d* and 130*e* to reach an aisle 150). Accordingly, in many standard seat configurations, it may be difficult for a passenger to access the aisle without disturbing one or more passengers seated closer to the aisle, especially if any of those passengers are occupying additional space by utilizing the sleeper configuration of their seats.

Alternative seating arrangements have been introduced in which seats are not all aligned parallel to the longitudinal axis of the aircraft. For example, the PCT published application WO2007124398 describes a so-called herringbone arrangement of seats. As shown in FIG. 1, in a herringbone arrangement, the axis of the seat 160 is shifted with respect to the axis 140 of the vehicle. Common rationale for utilizing the herringbone arrangement to improve passengers' comfort include that the herringbone arrangement can provide space for large sleeper seats and that the herringbone arrangement can allow individual passengers to egress from their own seats to the aisle without disturbing another passenger. Even so, because sleeper seats generally require more space than conventional seats, new or modified seating arrangements are desirable to remedy limitations of known seating arrangements.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment, a passenger accommodation assembly for a passenger vehicle is provided. The accommodation assembly can be configured as a column of at least two passenger seats. The column can be oriented parallel to an axis defining a forward and a backward direction. The column can include a first seat and a second seat. The first seat can be oriented to face toward the axis in a first direction not substantially parallel to the axis. The first seat can also be convertible by a relative movement of elements of the first seat between a first sitting mode and a first bed mode. In the first sitting mode, the first seat can be configured to support an occupant of the first seat in an upright seated position. In the first bed mode, elements of the first seat can form at least part of a first sleeping surface configured to support an occupant of the first seat in a substantially prone position. The second seat can be positioned behind the first seat in a direction parallel the backward direction. The second seat can be oriented to face toward the axis in a second direction not substantially parallel to the axis. The second seat can be convertible by a relative movement of elements of the second seat between a second sitting mode and a second bed mode. In the second sitting mode, the seat can be configured to support an occupant of the second seat in an upright seated position. In the second bed mode, elements of the second seat form at least part of a second sleeping surface configured to support an occupant of the second seat in a substantially prone position. When the second seat is in the second bed mode, the second sleeping surface can be situated at a different height relative to a reference surface from a height of the first sleeping surface relative to the reference surface such that at least a portion of the second sleeping surface vertically overlaps with at least a portion of the first sleeping surface.

In another embodiment, a passenger accommodation assembly for a passenger vehicle is provided. The passenger accommodation assembly can include first and second passenger seats and first and second footwells. The first passenger seat can be convertible between a first sitting mode and a first bed mode. The first seat can include a first seat pan, and the first seat pan can be configured in the first sitting mode to be positioned a first sitting height relative to a floor of the passenger vehicle. The first seat can include a first seat back, and the first seat back can be positioned in the first sitting mode in an upright position. The first seat can include a first sleeping surface. In the first bed mode, the first seat back can be positioned in a reclined position so as to cooperate with the first seat pan to form at least part of the first sleeping surface.

The second passenger seat can be positioned at least partially behind the first passenger seat. The second passenger seat can also be convertible between a second sitting mode and a second bed mode. The second seat can include a second seat pan, and the second seat pan can be configured in the second sitting mode to be positioned a second sitting height relative to a floor of the passenger vehicle. The second seat can include a second seat back, and the second seat back can be positioned in the second sitting mode in an upright position. The second seat can include a second sleeping surface. In the second bed mode, the second seat back can be positioned in a reclined position so as to cooperate with the second seat pan to form at least part of the second sleeping surface.

The first footwell can be such that when the first passenger seat is in the first bed mode, at least a portion of the first sleeping surface is positioned within the first footwell at a first bed height relative to the floor of the passenger vehicle. The second footwell can be positioned to least partially vertically overlap with the first footwell. The second footwell can be such that when the second passenger seat is in the second bed mode, at least a portion of the second sleeping surface is positioned within the second footwell at a second bed height relative to the floor of the passenger vehicle different from the first bed height.

In a further embodiment, a passenger accommodation assembly for a passenger vehicle is provided. The passenger accommodation assembly can include a first passenger seat convertible between a first sitting mode and a first bed mode. The first passenger seat can include a first seat pan and a first seat back. The first seat pan can be configured in the first sitting mode to be positioned at a first sitting height relative to a floor of the passenger vehicle. The first seat back can be positioned in the first sitting mode in an upright position. In the first bed mode, the first seat back can be positioned in a reclined position so as to cooperate with the first seat pan to form at least part of a first sleeping surface. The passenger accommodation assembly can also include a second passenger seat convertible between a sitting mode and a bed mode. The second seat can include a second seat pan and a second seat back. The second seat pan can be configured in the second sitting mode to be positioned at a second sitting height relative to a floor of the passenger vehicle. The second seat back can be positioned in the second sitting mode in an upright position. In the second bed mode, the second seat back can be positioned in a reclined position so as to cooperate with the second seat pan to form at least part of a second sleeping surface.

The first passenger seat and the second passenger seat can be positioned adjacent an axis defining a forward and a backward direction. The second passenger seat can be positioned behind the first seat in a direction parallel the backward direction. The first seat can be oriented to face toward one of the backward direction of the axis or the forward direction of the axis, and the second passenger seat can be oriented to face toward the same direction of the axis as the first seat. The second sleeping surface can be situated at a height relative to a reference surface, and the height can be different from a height of the first sleeping surface relative to the reference surface such that at least a portion of the second sleeping surface vertically overlaps with at least a portion of the first sleeping surface.

For a fuller understanding of the nature and advantages of the present invention, reference should be made to the ensuing detailed description and accompanying drawings.

BRIEF DESCRIPTION OF THE DRAWINGS

FIGS. 10A-12C are side views of seat units that can be used in arrangements in accordance with embodiments.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Disclosed herein are various arrangements of passenger seats and sleeping surfaces within an aircraft. Although arrangements herein are described in relation to aircraft, arrangements may be utilized in any passenger vehicle, including, but not limited to, aircraft, busses, trains, boats, and spacecraft. Arrangements can be configured so as to offer direct access to the aisle to all passengers in any seat configuration. Aisle access for a specific passenger may be available regardless of whether other passenger have configured their seats for use in an upright position, a reclined setting, or as a sleeping surface. Arrangements can also be configured to keep passenger density high. Keeping passenger density high may improve the economic viability of the arrangement for airlines or other entities that may consider implementing the arrangement in one or more portions of one or more aircrafts. Arrangements can also be configured to provide a sleeping surface for each passenger. The sleeping surface may be sufficiently wide to provide comfort for the passenger. The sleeping surface may also be fully horizontal and/or sufficiently horizontal to provide comfort for the passenger. The sleeping surface may include at least a portion distinct from the passenger seat, and/or a part of the passenger seat may convert to provide at least a portion of the sleeping surface.

Figure 1:
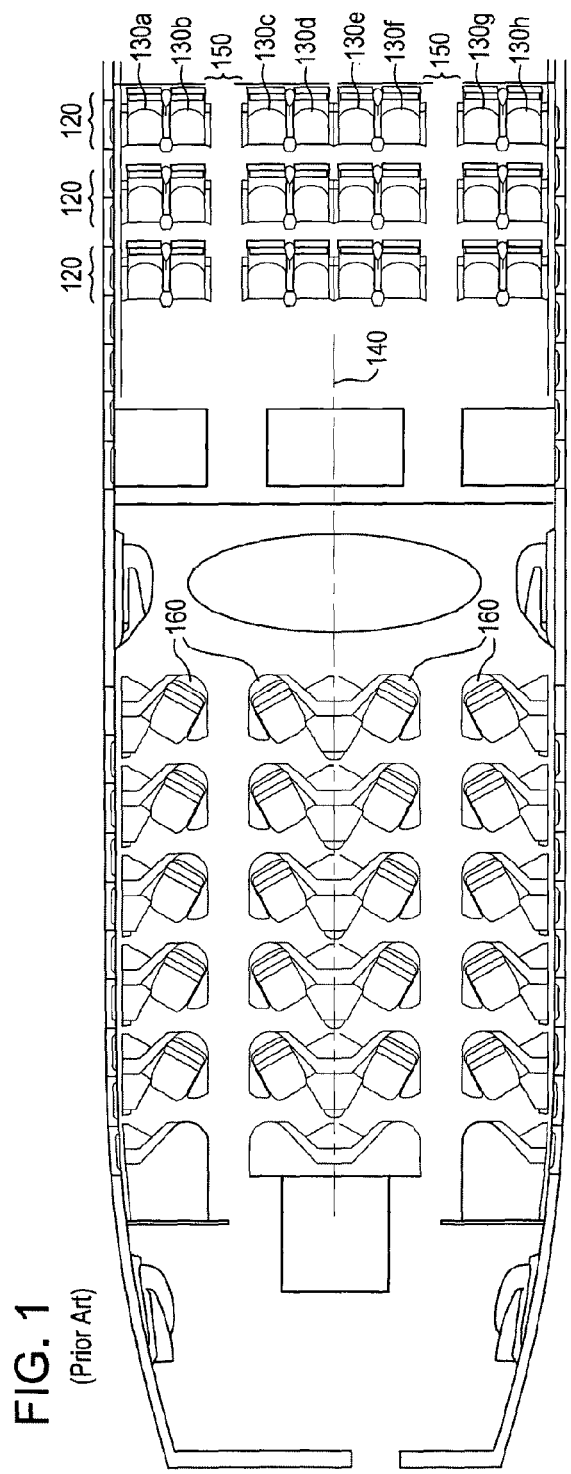
FIG. 1 is a top perspective view of an aircraft cabin having a traditional seating arrangement in the aft of the cabin and a herringbone arrangement in the fore of the cabin as known in the prior art.
Figure 2:
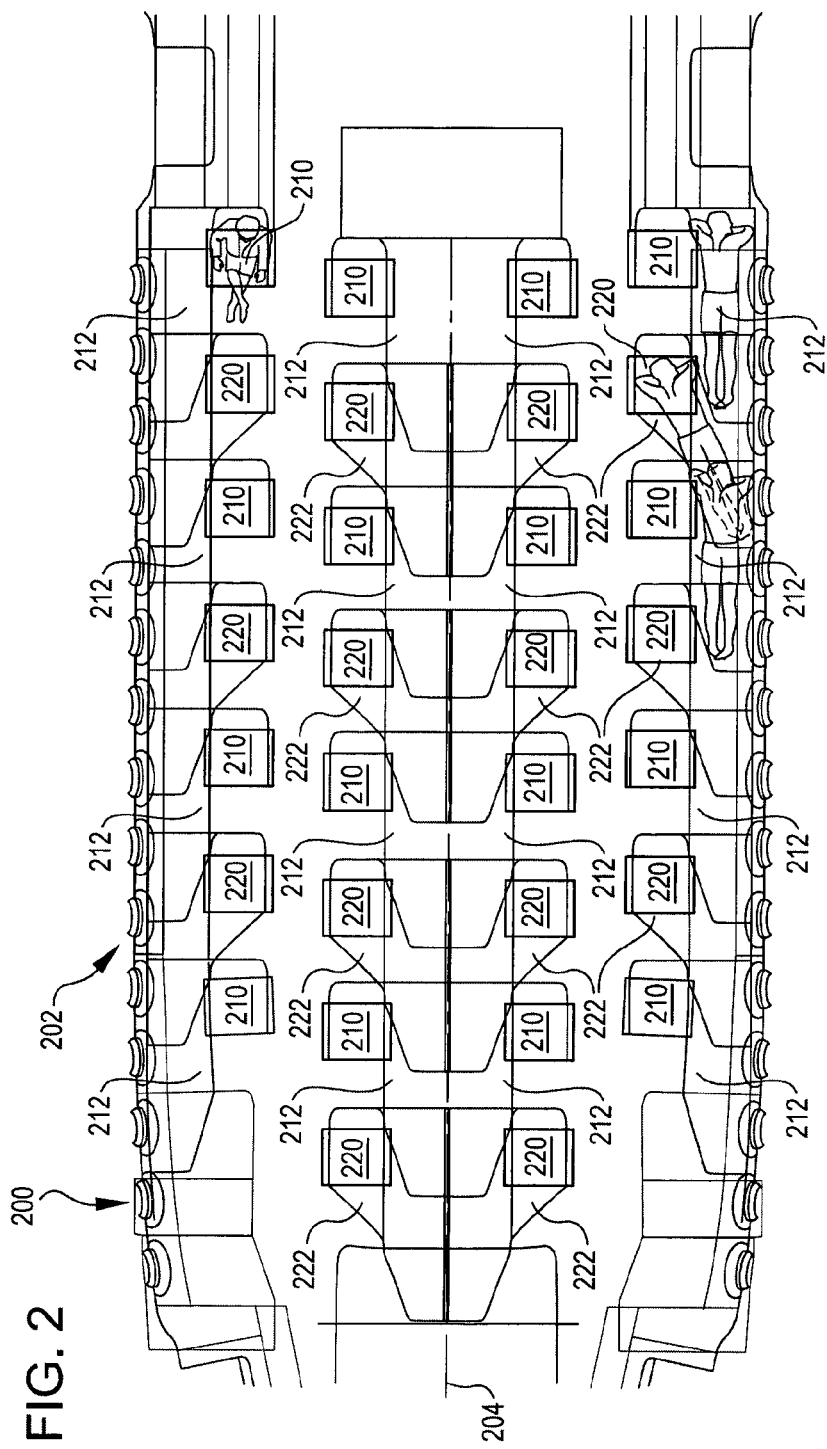
FIG. 2 is a top perspective view of an aircraft cabin having a first arrangement of seats and sleeping surfaces in accordance with embodiments.

Referring now to the drawings, in which like reference numerals represent like parts throughout the several views, FIG. 2 shows a top perspective view of an aircraft cabin 200 having a first arrangement 202 of seats and sleeping surfaces in accordance with embodiments. The arrangement 202 can include one or more first seats 210 and one or more second seats 220. All or less than all of the first seats 210 and the second seats 220 can be configured to face forward and/or a direction parallel or substantially parallel to the longitudinal axis 204 of the aircraft cabin 200. The arrangement 202 can also include one or more first sleeping surfaces 212 and one or more second sleeping surfaces 222. The first sleeping surfaces 212 can be positioned alongside first seats 210 and can be oriented substantially parallel to the first seats 210. Second sleeping surface 222 can be positioned alongside second seats 220 and can be oriented at an oblique angle relative to the orientation of the second seats 220. First sleeping surfaces 212 and second sleeping surfaces 222 can be positioned so as to vertically overlap. The arrangement 202 can include a repeating pattern of first seats 210, second seats 220, first sleeping surfaces 212, and second sleeping surfaces 222. The repeating pattern may include a regular grid of forward facing seats 210 and 220, a herringbone pattern of second sleeping surfaces 222, and/or a pattern of columns of first sleeping surfaces 212.

Figure 3:
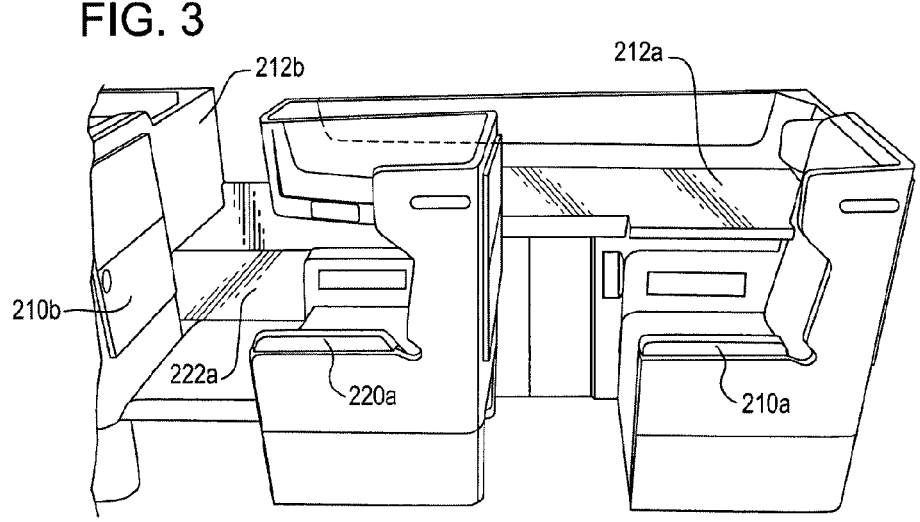
FIG. 3 is a side perspective view of a portion of the first arrangement of seats and sleeping surfaces in accordance with embodiments.

FIG. 3 is a side perspective view of a portion of the first arrangement 202 of seats and sleeping surfaces in accordance with embodiments. As depicted in FIG. 3, a first sleeping surface 212a can be positioned adjacent a first seat 210a. The first sleeping surface 212a can be vertically positioned at a different level than the first seat 210a. For example, the first sleeping surface 212a can be positioned at a level higher than the first seat 210a. Forward of the first seat 210a, a second seat 220a can be positioned. The second seat 220a can be positioned behind another first seat 210b. Alongside the second seat 220a, a second sleeping surface 222a can be positioned. The second sleeping surface 222a can extend forward at an oblique angle relative to the orientation of the second seat 220a. A portion of the second sleeping surface 222a can extend underneath another first sleeping surface 212b disposed forward of the second seat 220a. Accordingly, the forward first sleeping surface 212b and the second sleeping surface 222a may vertically overlap.

Figure 4:
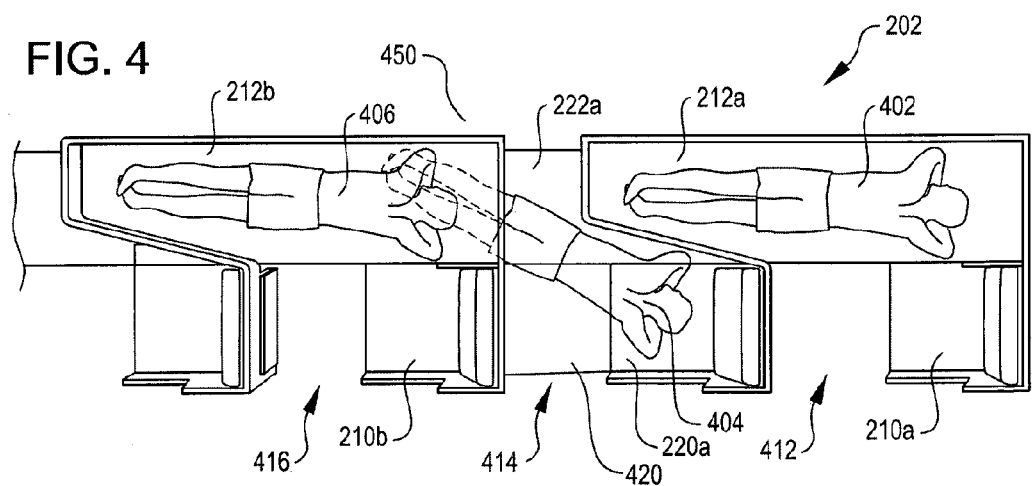
FIG. 4 is a top perspective view of a portion of the first arrangement of seats and sleeping surfaces showing passengers positioned on sleeping surfaces in accordance with embodiments.

The vertical overlap between the first sleeping surface 212b and the second sleeping surface 222a may be best seen in FIG. 4. FIG. 4 is a top perspective view of a portion of the first arrangement 202 of seats and sleeping surfaces showing passengers 402, 404, and 406 positioned on sleeping surfaces 212a, 222a, and 212b in accordance with embodiments. As depicted in FIG. 4, the first arrangement 202 of seats and sleeping surfaces can be configured so that the second sleeping surface 222a vertically overlaps with one or more first sleeping surfaces 212a and 212b. Due to the vertical overlap, more sleeping surfaces can be fit into the same cabin space, and passenger density can be increased. Additionally, in some aspects, the second seat 220a can accommodate a passenger 404 in both seated and prone positions. To switch from a seated position to a prone position, a panel 420 may be positioned flush with the second seat 220a. Providing the panel 420 can provide a portion of a substantially horizontally flat portion to serve as the second sleeping surface 222a.

As depicted in FIG. 4, the first arrangement 202 can be configured so that each passenger can have a space including a seat and a sleeping surface. For example, a first passenger 402 can be assigned a space 412, which can include a first seat 210a and a first sleeping surface 212a. A second passenger 404 can occupy a space 414 disposed forward of the space 412 for the first passenger 402, and the space 414 for the second passenger 404 can include a second seat 220a and a second sleeping surface 222a. A space 416 for a third passenger 406 can be disposed forward of the space 414 and can include another first seat 210b and another first sleeping surface 212b. The first arrangement 202 can be configured so that each passenger can have access to the aisle 450 without disturbing other passengers.

Figure 5:
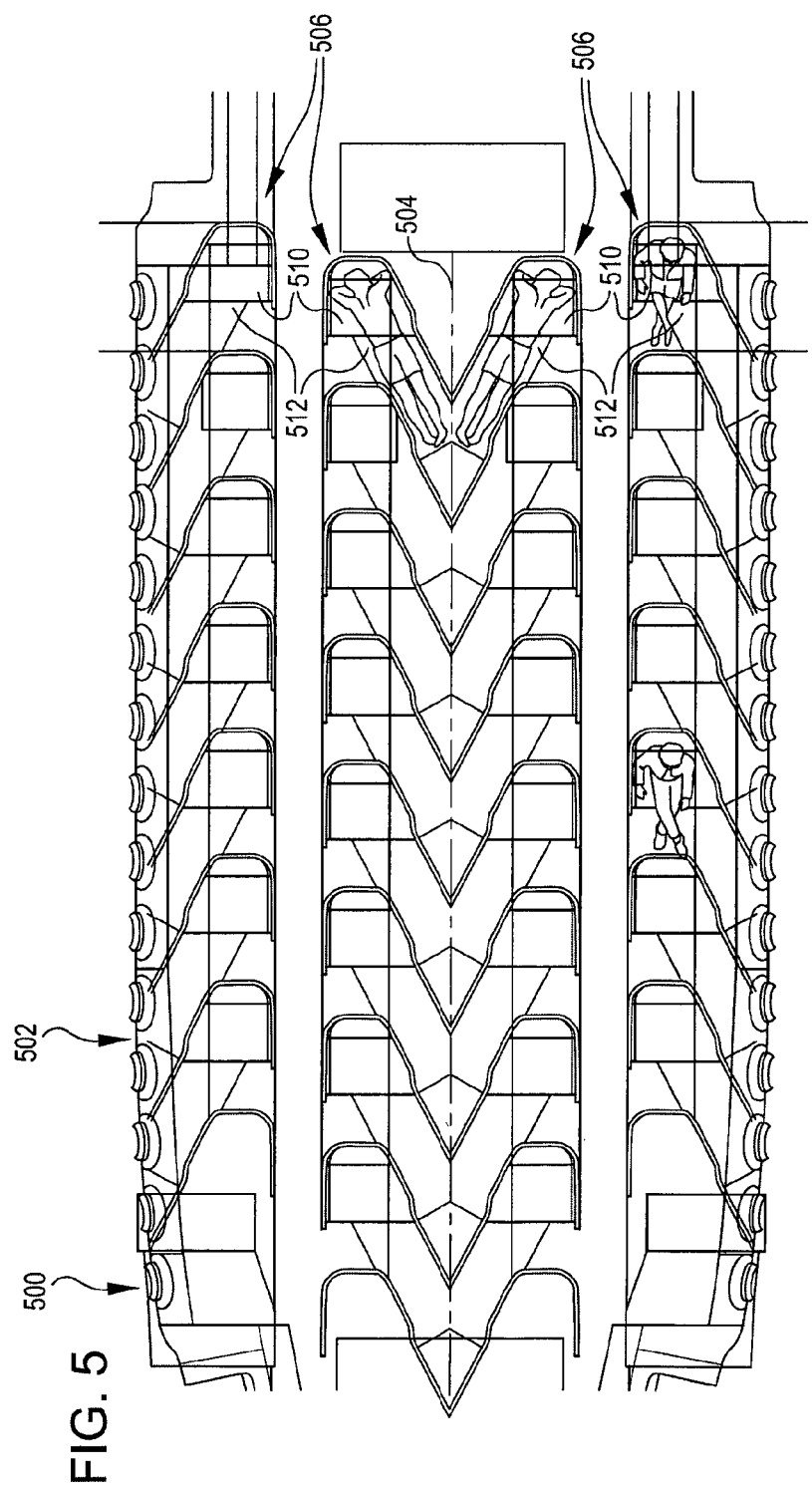
FIG. 5 is a top perspective view of an aircraft cabin having a second arrangement of seats and sleeping surfaces in accordance with embodiments.

FIG. 5 is a top perspective view of an aircraft cabin 500 having a second arrangement 502 of seats and sleeping surfaces in accordance with embodiments. The second arrangement can include one or more passenger accommodation units 506. The passenger accommodation unit 506 can include a seat 510. The seat 510 can be configured to face forward and/or a direction parallel or substantially parallel to the longitudinal axis 504 of the aircraft cabin 500. The passenger accommodation unit 506 can include a sleeping surface 512. The sleeping surface 512 can be positioned alongside the seat 510 and can be oriented at an oblique angle relative to the orientation of the seat 510.

The arrangement 502 can include a repeating pattern of passenger accommodation units 506. As depicted in FIG. 5, the passenger accommodation units can nestle together so as to form columns of forward facing seats 510. The seats can be separated by a distance based at least in part upon the width of the sleeping surfaces 512 and/or the degree of the oblique angle at which the sleeping surfaces 512 extend from the seat 510. The passenger accommodation units 506 can be arranged so that seats 510 are aligned in a column and each sleeping surface 512 extends forward and laterally from a first seat 510 to a position alongside the next seat 510 forward in the column. The repeating pattern may include a regular grid of forward facing seats 510 and a herringbone pattern of sleeping surfaces 512.

Figure 6:
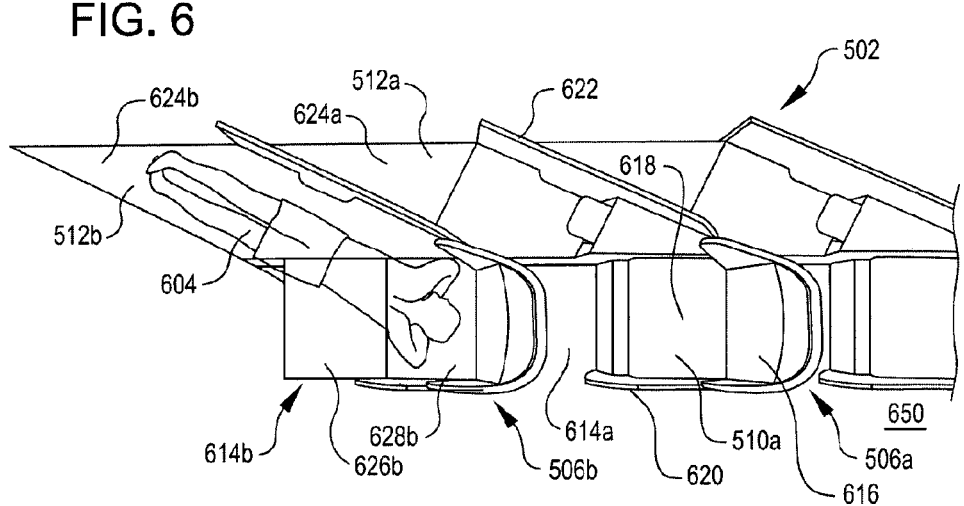
FIG. 6 is a top perspective view of a portion of the second arrangement of seats and sleeping surfaces showing a passenger positioned on a sleeping surface in accordance with embodiments.

FIG. 6 is a top perspective view of a portion of the second arrangement 502 of seats and sleeping surfaces showing a passenger 604 positioned on a sleeping surface 512 in accordance with embodiments. A passenger accommodation unit 506*a* is depicted in FIG. 6 in a sitting mode. In a sitting mode, the passenger accommodation unit 506*a* can be configured to provide a seat 510*a* in which a passenger may sit. A footwell 614 can provide a space for the passenger's feet while sitting. The seat 510*a* can include a backrest 616 and a seat cushion 618. The passenger accommodation unit 506*a* can also include an armrest 620. The arm rest may be oriented parallel to the aisle 650. The passenger accommodation unit 506*a* can also include a privacy screen 622. The privacy screen 622 can separate the passenger accommodation unit 506 from external disturbances. The passenger accommodation unit 506*a* can also include a supplemental surface 624*a*. The supplemental surface 624*a* can be utilized when the passenger accommodation unit is to be used in a sleeping mode.

A passenger accommodation unit 506*b* is depicted in FIG. 6 in a sleeping mode. To convert into a sleeping mode, panels 626*b* and 628*b* can be added to the supplemental surface 624*b* to form the sleeping surface 512*b*. Panel 626*b* can cover footwell 614*b*. Panels 626*b* and 628*b* can be cushions such as seat cushion 618 or backrest 616. However, panels 626*b* and 628*b* can also be additional parts which do not form part of seat 510.

Figure 7:
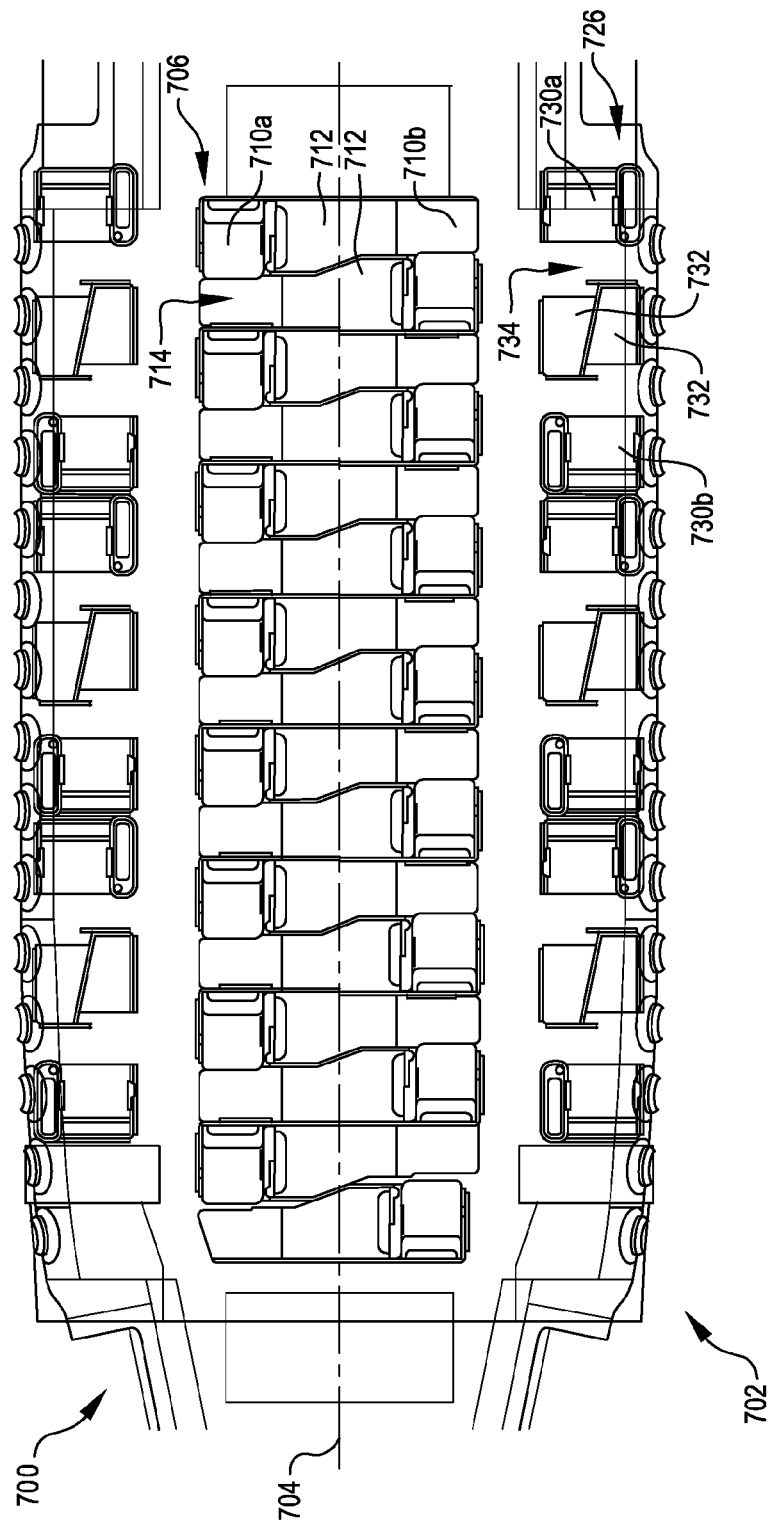
FIG. 7 is a top perspective view of an aircraft cabin having a third arrangement of seats and sleeping surfaces in accordance with embodiments.

FIG. 7 is a top perspective view of an aircraft cabin 700 having a third arrangement 702 of seats and sleeping surfaces in accordance with embodiments. The third arrangement can include one or more central passenger accommodation units 706. The third arrangement can also include one or more lateral passenger accommodation units 726.

Figure 8:
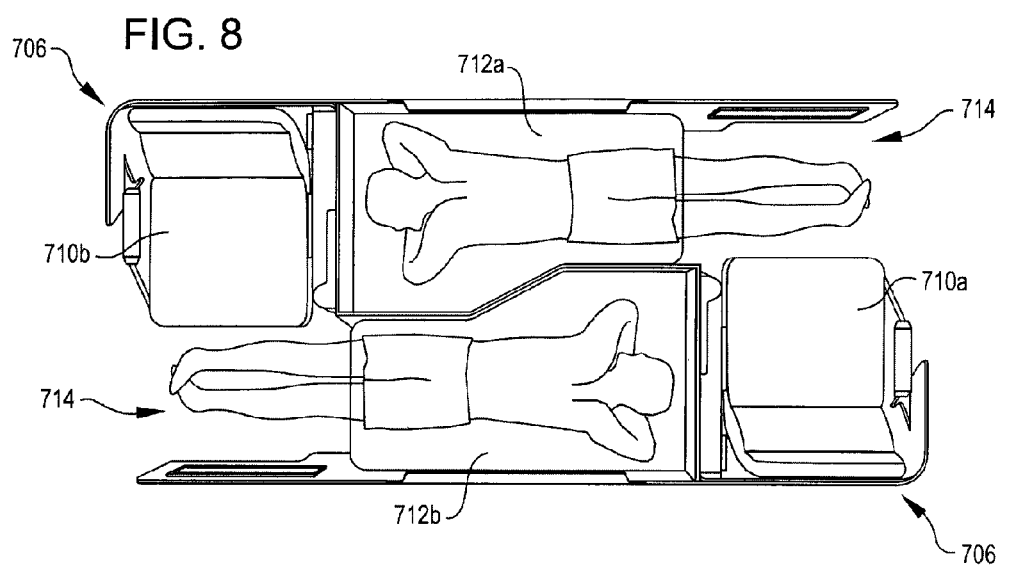
FIG. 8 is a top perspective view of a portion of the third arrangement of seats and sleeping surfaces showing central seats in the arrangement in accordance with embodiments.

FIG. 8 is a top perspective view of a portion of the third arrangement of seats and sleeping surfaces showing central seats in the arrangement in accordance with embodiments. The central passenger accommodation unit 706 can include a seat 710. The seat 710 can be configured to face a direction parallel or substantially parallel to the longitudinal axis 704 of the aircraft cabin 700. The central passenger accommodation unit 706 can include a footwell 714 disposed adjacent to the seat 710. The central passenger accommodation unit 706 can include a sleeping surface 712. The sleeping surface 712 can be positioned adjacent the seat 710 and can be oriented substantially perpendicular relative to the orientation of the seat 510. The sleeping surface can be aligned with the footwell 714 and may be disposed so as to extend away from the footwell.

The arrangement 702 can include a repeating pattern of central passenger accommodation units 706. As depicted in FIGS. 7 and 8, the central passenger accommodation units 706 can be arranged in an alternating pattern. The alternating pattern can provide pairs of opposite-facing seats 710*a* and 710*b* having a pair of sleeping surfaces 712*a* and 712*b* disposed therebetween. For example, one seat 710*a* may face forward while a complementary seat 710*b* faces backward. The central passenger central accommodation units 706 can also be arranged so that seats 710 are aligned in columns.

Figure 9:
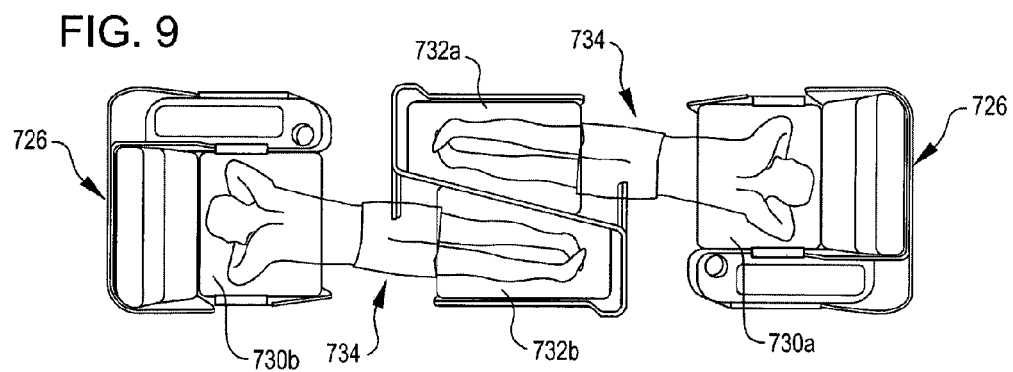
FIG. 9 is a top perspective view of a portion of the third arrangement of seats and sleeping surfaces showing lateral seats in the arrangement in accordance with embodiments.

FIG. 9 is a top perspective view of a portion of the third arrangement of seats and sleeping surfaces showing lateral seats in the arrangement in accordance with embodiments. The third arrangement can include one or more lateral passenger accommodation units 726. The lateral passenger accommodation unit 726 can include a seat 730. The seat 730 can be configured to face a direction parallel or substantially parallel to the longitudinal axis 704 of the aircraft cabin 700. The lateral passenger accommodation unit 726 can include a footwell 734 disposed adjacent to the seat 730. The lateral passenger accommodation unit 726 can include a sleeping surface supplement 732. The sleeping surface supplement 732 can be positioned adjacent footwell 734 on the side of the footwell 734 opposite the seat 730. The sleeping surface supplement 732 can be aligned with one side of the seat 730 and be sized so as to have a width less than the width of the seat 730.

The arrangement 702 can also include a repeating pattern of lateral passenger accommodation units 726. As depicted in FIGS. 7 and 9, the lateral passenger accommodation units 726 can be arranged in an alternating pattern. The alternating pattern can provide pairs of opposite-facing seats 730*a* and 730*b* having a pair of sleeping surfaces 732*a* and 732*b* disposed therebetween. For example, one seat 730*a* may face forward while a complementary seat 730*b* faces backward. The lateral passenger accommodation units 726 can be arranged so that seats 730 are aligned in columns.

Figure 10A:
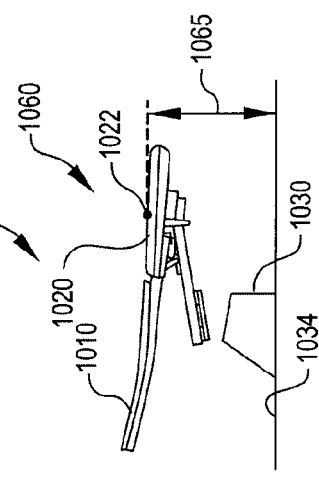

FIGS. 10A-12C are side views of seat units 1000, 1100, and 1200 that can be used in arrangements in accordance with embodiments. Seat units 1000, 1100, and 1200 can provide differing heights for varying seat configurations. For example, as depicted in FIGS. 11A-11C, a standard height seat 1100 can provide varying seat configurations at a standard height. As depicted in FIGS. 10A-10C, a high height seat 1000 can provide varying seat configurations at a height higher than the height provided by the standard height seat 1100. As depicted in FIGS. 12A-12C, a low height seat 1200 can provide varying seat configurations at a height lower than the height provided by the standard height seat 1100.

Figure 11A:
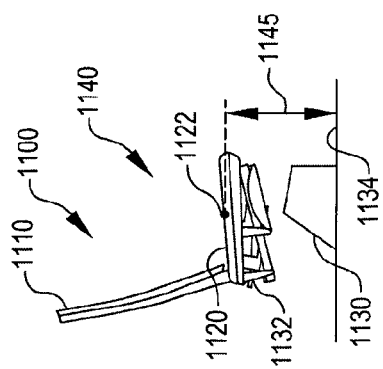
Figure 11B:
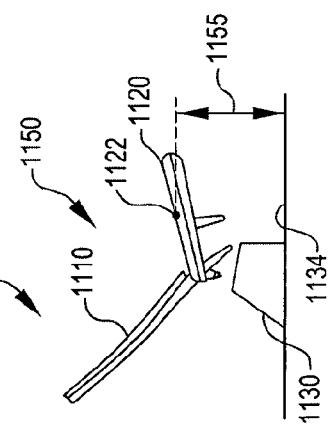
Figure 11C:
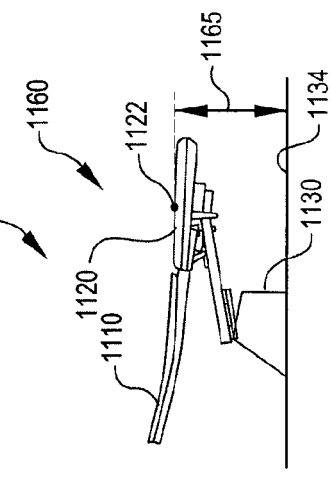

As depicted in FIGS. 11A-11C, a standard height seat 1100 can include a seat back 1110, a seat pan 1120. A base 1130 can support the seat 1100 relative to a floor 1134. The seat 1100 can be attached to the base 1130 via a mechanism 1132 configured to move the seat back 1110 and/or seat pan 1120 relative to the base 1130. The mechanism 1132 can be used to move the seat back 1110 and the seat pan 1120 between different configurations. Configurations of the seat back 1110 and the seat pan 1120 can include a sitting configuration 1140, a cradle configuration 1150, and a bed configuration 1160.

As depicted in FIG. 11A, in a sitting configuration 1140, the seat back 1110 can be oriented so as to be positioned approximately perpendicular relative the seat pan 1120. In the seated configuration 1140, the seat back 1110 can be oriented vertically or substantially vertically, and the seat pan 1120 can be oriented horizontally or substantially horizontally. The seat 1100 in the seated configuration 1140 can support a passenger seated in an upright seated position.

As depicted in FIG. 11B, in a cradle configuration 1150, the seat back 1110 can be oriented so as to be positioned at an obtuse angle relative the seat pan 1120. In the cradle configuration 1150, the seat back 1110 can be oriented so that its top end is tilted backward from its bottom end. The seat pan 1120 can be oriented so that its front end is higher than its back end. The seat 1100 in the cradle configuration 1150 can support a passenger seated in reclined seated position.

As depicted in FIG. 11C, in a bed configuration 1160, the seat back 1110 can be oriented so as to be positioned so as to be linearly aligned with the seat pan 1120. In the bed configuration 1160, the seat back 1110 can be oriented horizontally or substantially horizontally. The seat pan 1120 can be oriented horizontally or substantially horizontally. The seat back 1110 and the seat pan 1120 can be arranged so as to form a substantially flat and/or continuous surface. The seat 1100 in the bed configuration 1160 can support a passenger in a prone position.

The standard height seat 1100 can provide the cradle configuration 1150 and/or the bed configuration 1160 at approximately the same height as the sitting configuration 1140. As depicted in FIG. 11A, in the seated configuration 1140, the seat pan can be positioned at a sitting height 1145 relative the floor 1134. The sitting height 1145 can be measured from a designated point 1122 on the seat pan 1120, including, but not limited to the midpoint of a top surface of the seat pan 1120. As depicted in FIG. 11B, in the cradle configuration 1150, the seat pan can be positioned at a cradle height 1155 relative the floor 1134, measured from the same designated point 1122 on the seat pan 1120 as the sitting height 1145. The cradle height 1155 can be approximately equal to the sitting height 1145. As depicted in FIG. 11C, in the bed configuration 1160, the seat pan can be positioned at a bed height 1165 relative the floor 1134, measured from the same designated point 1122 on the seat pan 1120 as the sitting height 1145 and/or the cradle height 1155. The bed height 1165 can be approximately equal to either or both of the sitting height 1145 and the cradle height 1155.

Figure 10B:
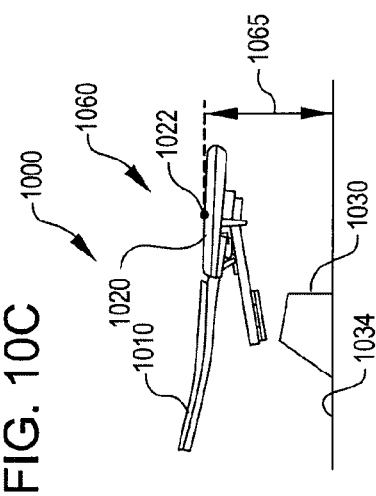
Figure 10C:
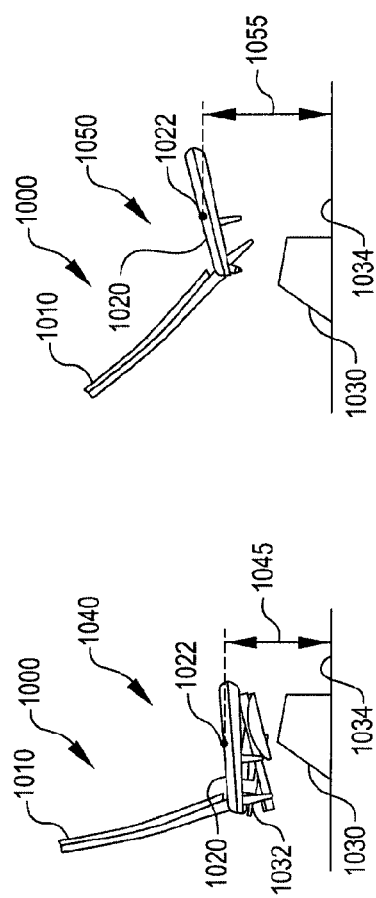

As depicted in FIGS. 10A-10C, a high height seat 1000 can include a seat back 1010, a seat pan 1020. A base 1030 can support the seat 1000 relative to a floor 1034. The seat 1000 can be attached to the base 1030 via a mechanism 1032 configured to move the seat back 1010 and/or seat pan 1020 relative to the base 1030. The mechanism 1032 can be used to move the seat back 1010 and the seat pan 1020 between different configurations. Configurations of the seat back 1010 and the seat pan 1020 can include a sitting configuration 1040, a cradle configuration 1050, and a bed configuration 1060.

As depicted in FIG. 10A, in a sitting configuration 1040, the seat back 1010 can be oriented so as to be positioned approximately perpendicular relative the seat pan 1020. In the seated configuration 1040, the seat back 1010 can be oriented vertically or substantially vertically, and the seat pan 1020 can be oriented horizontally or substantially horizontally. The seat 1000 in the seated configuration 1040 can support a passenger seated in an upright seated position.

As depicted in FIG. 10B, in a cradle configuration 1050, the seat back 1010 can be oriented so as to be positioned at an obtuse angle relative the seat pan 1020. In the cradle configuration 1050, the seat back 1010 can be oriented so that its top end is tilted backward from its bottom end. The seat pan 1020 can be oriented so that its front end is higher than its back end. The seat 1000 in the cradle configuration 1050 can support a passenger seated in an upright seated position.

As depicted in FIG. 10C, in a bed configuration 1060, the seat back 1010 can be oriented so as to be positioned so as to be linearly aligned with the seat pan 1020. In the bed configuration 1060, the seat back 1010 can be oriented horizontally or substantially horizontally. The seat pan 1020 can be oriented horizontally or substantially horizontally. The seat back 1010 and the seat pan 1020 can be arranged so as to form a substantially flat and/or continuous surface. The seat 1000 in the bed configuration 1060 can support a passenger in a prone position.

The high height seat 1000 can provide the cradle configuration 1050 and/or the bed configuration 1060 at a higher height than the sitting configuration 1040. As depicted in FIG. 10A, in the seated configuration 1040, the seat pan can be positioned at a sitting height 1045 relative the floor 1034. The sitting height 1045 can be measured from a designated point 1022 on the seat pan 1020, including, but not limited to the midpoint of a top surface of the seat pan 1020. As depicted in FIG. 10B, in the cradle configuration 1050, the seat pan can be positioned at a cradle height 1055 relative the floor 1034, measured from the same designated point 1022 on the seat pan 1020 as the sitting height 1045. The cradle height 1055 can be greater than the sitting height 1045. As depicted in FIG. 10C, in the bed configuration 1060, the seat pan can be positioned at a bed height 1065 relative the floor 1034, measured from the same designated point 1022 on the seat pan 1020 as the sitting height 1045 and/or the cradle height 1055. The bed height 1065 can be greater than either or both of the sitting height 1045 and the cradle height 1055

Additionally, the high height seat 1000 can provide configurations at higher heights than the standard height seat 1100. For example, as depicted in FIGS. 10B and 11B, the cradle height 1055 provided by the high height seat 1000 can be greater than the cradle height 1155 provided by the standard height seat 1100. As depicted in FIGS. 10C and 11C, the bed height 1065 provided by the high height seat 1000 can be greater than the bed height 1165 provided by the standard height seat 1100.

As depicted in FIGS. 12A-12C, a low height seat 1200 can include a seat back 1212, a seat pan 1220. A base 1230 can support the seat 1200 relative to a floor 1234. The seat 1200 can be attached to the base 1230 via a mechanism 1232 configured to move the seat back 1212 and/or seat pan 1220 relative to the base 1230. The mechanism 1232 can be used to move the seat back 1212 and the seat pan 1220 between different configurations. Configurations of the seat back 1212 and the seat pan 1220 can include a sitting configuration 1240, a cradle configuration 1250, and a bed configuration 1260.

As depicted in FIG. 12A, in a sitting configuration 1240, the seat back 1212 can be oriented so as to be positioned approximately perpendicular relative the seat pan 1220. In the seated configuration 1240, the seat back 1212 can be oriented vertically or substantially vertically, and the seat pan 1220 can be oriented horizontally or substantially horizontally. The seat 1200 in the seated configuration 1240 can support a passenger seated in an upright seated position.

As depicted in FIG. 12B, in a cradle configuration 1250, the seat back 1212 can be oriented so as to be positioned at an obtuse angle relative the seat pan 1220. In the cradle configuration 1250, the seat back 1212 can be oriented so that its top end is tilted backward from its bottom end. The seat pan 1220 can be oriented so that its front end is higher than its back end. The seat 1200 in the cradle configuration 1250 can support a passenger seated in a reclined seated position.

As depicted in FIG. 12C, in a bed configuration 1260, the seat back 1212 can be oriented so as to be positioned so as to be linearly aligned with the seat pan 1220. In the bed configuration 1260, the seat back 1212 can be oriented horizontally or substantially horizontally. The seat pan 1220 can be oriented horizontally or substantially horizontally. The seat back 1212 and the seat pan 1220 can be arranged so as to form a substantially flat and/or continuous surface. The seat 1200 in the bed configuration 1260 can support a passenger in a prone position.

The low height seat 1200 can provide the cradle configuration 1250 and/or the bed configuration 1260 at a lower height than the sitting configuration 1240. As depicted in FIG. 12A, in the seated configuration 1240, the seat pan can be positioned at a sitting height 1245 relative the floor 1234. The sitting height 1245 can be measured from a designated point 1222 on the seat pan 1220, including, but not limited to the midpoint of a top surface of the seat pan 1220. As depicted in FIG. 12B, in the cradle configuration 1250, the seat pan can be positioned at a cradle height 1255 relative the floor 1234, measured from the same designated point 1222 on the seat pan 1220 as the sitting height 1245. The cradle height 1255 can be lower than the sitting height 1245. As depicted in FIG. 12C, in the bed configuration 1260, the seat pan can be positioned at a bed height 1265 relative the floor 1234, measured from the same designated point 1222 on the seat pan 1220 as the sitting height 1245 and/or the cradle height 1255. The bed height 1265 can be lower than either or both of the sitting height 1245 and the cradle height 1255.

Additionally, the low height seat 1200 can provide configurations at lower heights than the standard height seat 1100. For example, as depicted in FIGS. 12B and 11B, the cradle height 1255 provided by the low height seat 1200 can be lower than the cradle height 1155 provided by the standard height seat 1100. As depicted in FIGS. 12C and 11C, the bed height 1265 provided by the low height seat 1200 can be lower than the bed height 1165 provided by the standard height seat 1100.

Seats providing differing heights for differing configurations, such as high height seats 1000, standard height seats 1100, and low height seats 1200 can be utilized in various seat arrangements. High height seats 1000, standard height seats 1100, and low height seats 1200 can each be utilized in conjunction with other seat types. Although high height seats 1000, standard height seats 1100, and low height seats 1200 have been described herein as different types of seats, one seat can be configured to selectively function as one or more type of seat. For example, a low height seat 1200 can include a mechanism 1232 that is not only capable of moving the seat back 1210 and the seat pan 1220 between different low height configurations 1240, 1250, and/or 1260, but is also capable of functioning like a mechanism 1032 and/or 1132 to move the the seat back 1210 and the seat pan 1220 between low height and/or standard height configurations 1040, 1050, 1060, 1140, 1150, and/or 1160.

High height seats 1000, standard height seats 1100, and low height seats 1200 can be configured to provide both the sitting surface and the sleeping surface for a passenger in arrangements of seats and sleeping surfaces. For example, a standard height seat 1100 may provide a sleeping surface in the bed configuration 1160. The same standard height seat 1100 may provide a seat as a sitting surface in the sitting 1140 and/or 1150 cradle configurations.

Figure 13:
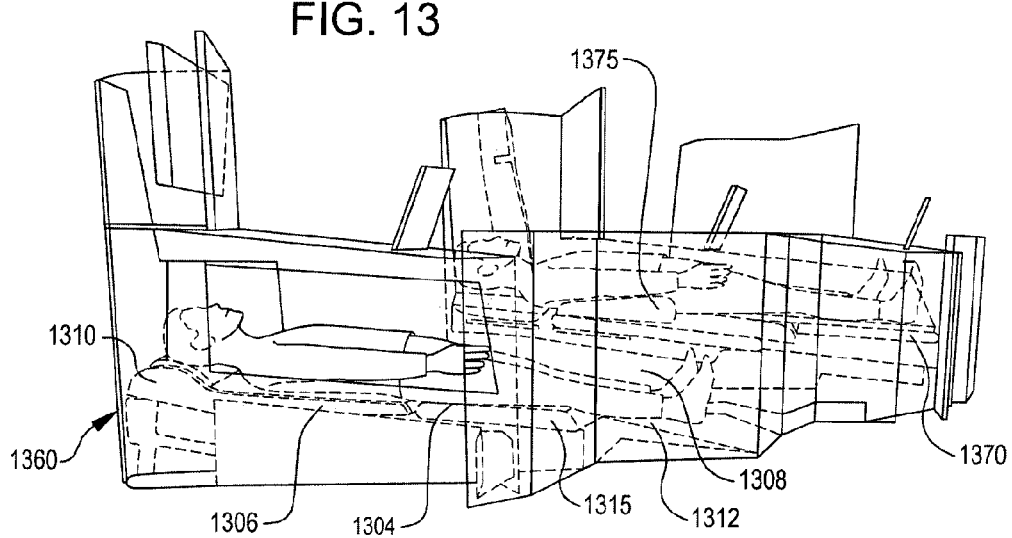
FIG. 13 is a side perspective view of an arrangement utilizing seat configurations at differing heights in accordance with embodiments.

A seat 1310 which may be utilized to provide both the sitting surface and the sleeping surface in arrangements will now be described in greater detail with reference to FIGS. 13-18. FIG. 13 is a side perspective view of an arrangement utilizing seat configurations at differing heights in accordance with embodiments. A passenger seat 1310 can include a seat back 1306 and a seat pan 1304. The seat 1310 can be convertible between a sitting mode and a bed mode 1360. The seat 1310 may include a seat pan 1304 and a seat back 1306. As described in greater detail with reference to seat 1810a depicted in FIG. 18 below, in the sitting mode 1840, the seat pan 1804 can be oriented substantially horizontally. The seat back 1806 can be oriented substantially vertically. The substantially horizontal orientation of the seat pan 1804 and the substantially vertical orientation of the seat back 1806 can be configured to accommodate a passenger in an upright seated position. Referring again to FIG. 13, a footwell 1308 can be positioned proximate the seat. The footwell may be a space suitably sized so as to accommodate the legs and feet of a passenger when the seat is in the sitting mode. The footwell 1308 may also be suitably sized so as to accommodate at least a portion of the passenger in a prone position when the seat is in a bed mode 1360, as will now be described.

In the bed mode 1360, as depicted in FIG. 13, the seat 1310 can provide a sleeping surface 1314. The sleeping surface 1314 can extend into the footwell 1308. The sleeping surface 1314 can be substantially flat, substantially continuous, and/or substantially horizontal. The sleeping surface can be suitably sized so as to accommodate the passenger in a prone position. As depicted in FIG. 13, the sleeping surface may include the seat pan 1304. The sleeping surface may also include a footrest 1312. The footrest may be disposed in the footwell when the seat 1310 is in the bed mode 1360. The footrest 1312 may optionally form part of the seat when the seat is not in bed mode 1360. The footrest 1312 may optionally form part of the footwell 1308 when the seat 1310 is not in bed mode 1360. The sleeping surface may also include the seat back 1306. The seat pan 1304 can cooperate with the footrest 1312 and/or the seat back 1306 to define the sleeping surface.

As depicted in FIG. 13, a first seat 1310 may be configured to provide a sleeping surface 1315 positioned at a first height relative to the floor. An adjacent seat 1370 may be configured to provide a sleeping surface 1375 positioned at a second height. As depicted in FIG. 13, the difference between the first and the second heights can be sufficient such that at least a portion of the sleeping surface 1315 provided by the first seat 1310 can be disposed beneath the sleeping surface 1375 provided by the adjacent seat 1370. In this way, at least a portion of the sleeping surface 1315 provided by the first seat 1310 can be positioned so as to vertically overlap with at least a portion of the sleeping surface 1375 of the adjacent seat 1370. The vertical overlap between the sleeping surfaces of adjacent seats can provide space savings in seat arrangements. Various arrangements utilizing such vertical overlap are described further herein with reference to FIGS. 14-24.

Figure 14:
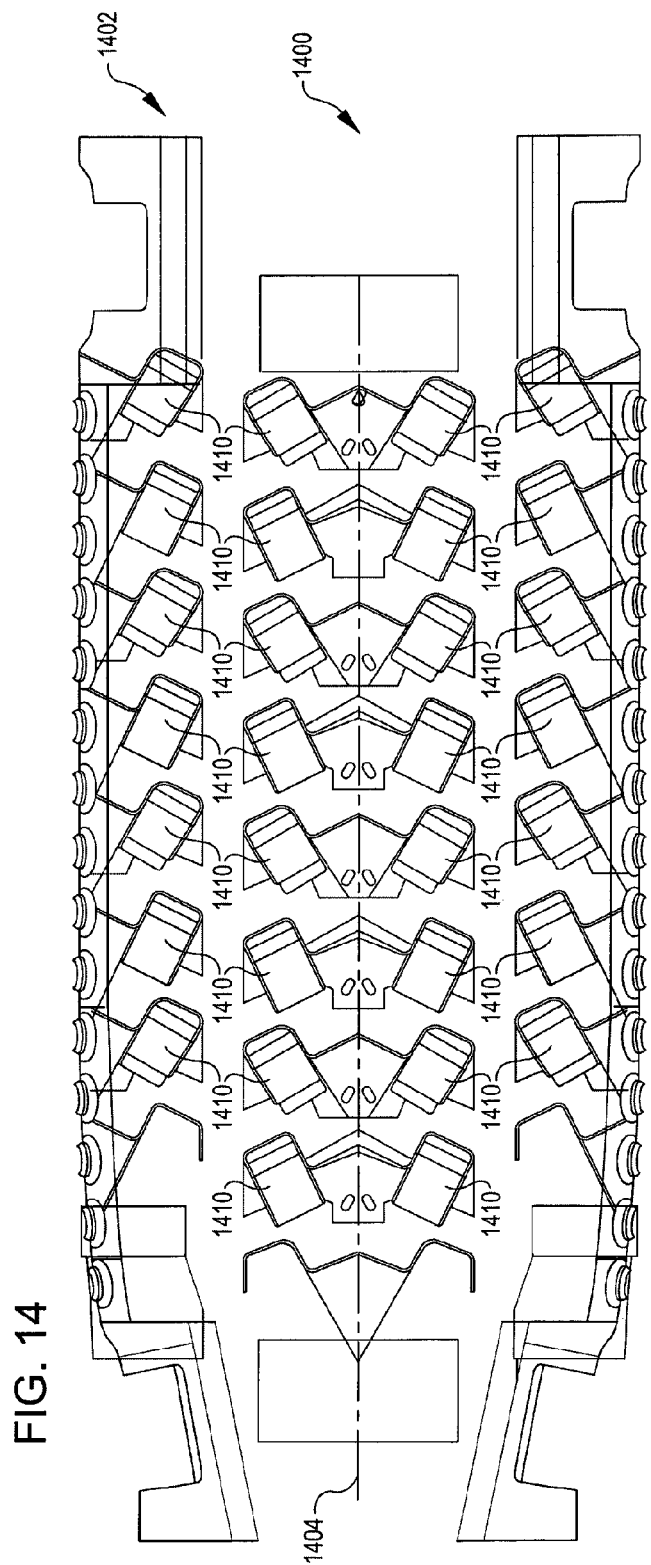
FIG. 14 is a top perspective view of an aircraft cabin having a fourth arrangement of seats and sleeping surfaces utilizing vertical overlap of sleeping surfaces laterally adjacent in accordance with embodiments.

FIG. 14 is a top perspective view of an aircraft cabin 1400 having a fourth arrangement 1402 of seats and sleeping surfaces utilizing vertical overlap of laterally adjacent sleeping surfaces in a column in accordance with embodiments. The arrangement 1402 can have a plurality of seats 1410. The seats can be the seats 1310 described in greater detail with reference to FIG. 13 above. The arrangement 1402 of seats can resemble a herringbone pattern. The seats 1410 can be organized in columns of laterally adjacent seats. The columns can run parallel to the axis of the vehicle. Columns can be separated by aisles. Seats 1410 may be positioned so as to all face partially forward, with the axis of each seat 1410 shifted with respect to the axis 1404 of the vehicle. Seats 1410 may also be positioned so as to all face partially backward, with the axis of each seat 1410 shifted with respect to the axis 1404 of the vehicle. The axis of each seat in a column may be shifted by the same amount. The orientation of the axis of a particular seat may also differ from the orientation of the axis of a seat adjacent in the column. One or more sleeping areas can be configured to vertically overlap with one or more laterally adjacent sleeping areas adjacent in the column as described further with respect to FIG. 15 below. This vertical overlap can allow seats to be arranged closer together or beds to be wider than in a standard herringbone arrangement.

Figure 15:
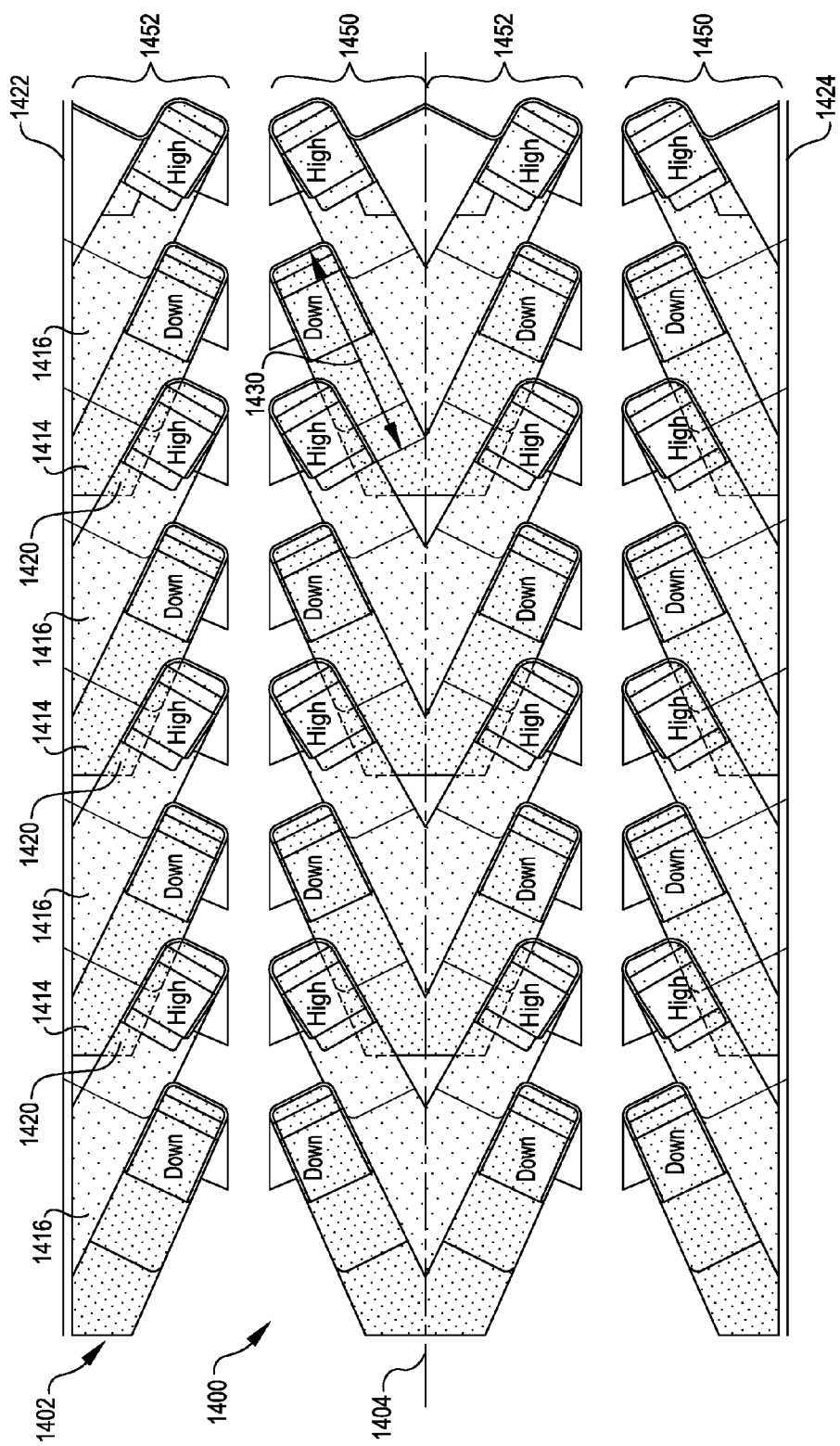
FIG. 15 is a top perspective view of an aircraft cabin having the fourth arrangement of seats and sleeping surfaces showing relative vertical positioning of sleeping surfaces in accordance with embodiments.

FIG. 15 is a top perspective view of an aircraft cabin 1400 having the fourth arrangement 1402 of seats and sleeping surfaces showing relative vertical positioning of sleeping surfaces in accordance with embodiments. As depicted in FIG. 15, the arrangement 1402 can include an alternating pattern including columns of laterally adjacent low sleeping surfaces 1414 and high sleeping surfaces 1416. Each sleeping surface in the alternating pattern of low sleeping surfaces 1414 and high sleeping surfaces 1416 can correspond to a seat 1410, such as the seat 1310 as described with reference to FIG. 13 above. Low sleeping surfaces 1414 can be disposed at a height that is lower than the height at which the high sleeping surfaces 1416 are disposed. The difference in height between a low sleeping surface 1414 and an adjacent high sleeping surface 1416 can be provided by the use of some combination of high height seats 1000, standard height seats 1100, and low height seats 1200 described above with reference to FIG. 10A-12C. For example, a low height seat 1200 configured in a bed mode 1260 can be utilized to provide a low sleeping surface 1414, and either a standard height seat 1100 configured in a bed mode 1160 or a high height seat 1000 configured in a bed mode 1260 can provide the adjacent high sleeping surface 1416. As another example, a standard height seat 1100 configured in a bed mode 1160 can be utilized to provide a low sleeping surface 1414, and a high height seat 1000 configured in a bed mode 1260 can provide the adjacent high sleeping surface 1416.

Low sleeping surfaces 1414 can be positioned at least partially below the high sleeping surfaces 1416. A low sleeping surface 1414 can be disposed so that at least a portion 1420 of the low sleeping surface 1414 overlaps vertically with at least part of the high sleeping surface 1416 positioned immediately forward of the low sleeping surface 1414 in the column. Low sleeping surfaces 1414 can be arranged in an alternating pattern with high sleeping surfaces 1416 into columns 1450 and 1452 running parallel to the axis 1404 of the vehicle. An alternating group of low sleeping surfaces 1414 7 Jun. 18, 2015 and high sleeping surfaces 1416 facing a port wall 1422 can form a port-faced column 1452. An alternating group of low sleeping surfaces 1414 and high sleeping surfaces 1416 facing a starboard wall 1424 can form a starboard-faced column 1450. As depicted in FIG. 15, a starboard-faced column 1450 may be a positioned opposite a port-faced column 1452. The starboard-faced column 1450 and the port-faced column 1452 may be aligned symmetrically opposite one another so that low sleeping surfaces 1414 in the starboard-faced column 1450 are disposed in a mirror image of the low sleeping surfaces 1414 in the port-faced column 1452.

Figure 16:
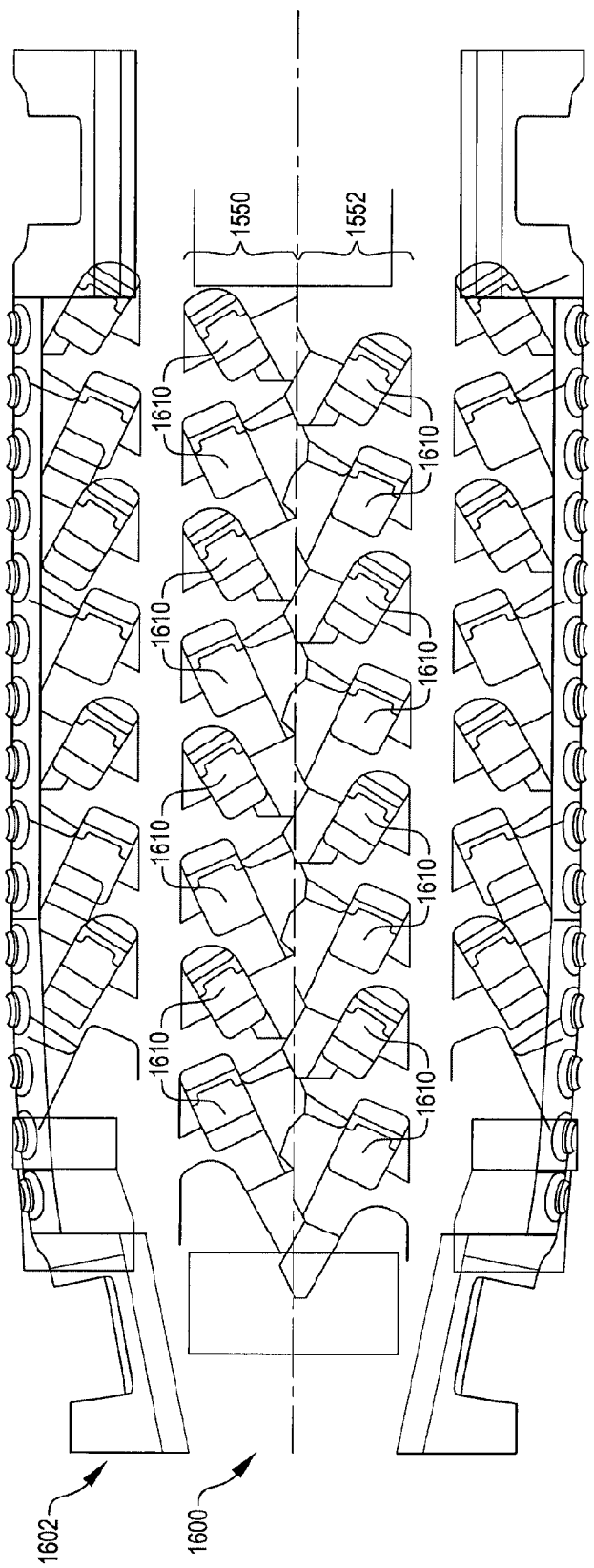
FIG. 16 is a top perspective view of an aircraft cabin having an alternate fourth arrangement of seats and sleeping surfaces utilizing vertical overlap of laterally adjacent sleeping surfaces in accordance with embodiments.

FIG. 16 is a top perspective view of an aircraft cabin 1600 having an alternate fourth arrangement 1602 of seats and sleeping surfaces utilizing vertical overlap of laterally adjacent sleeping surfaces in accordance with embodiments. The alternate fourth arrangement 1602 may differ from the fourth arrangement 1402 described above in that a number of seats 1610 can be aligned in oppositely facing columns 1650 and 1652 that are not aligned to produce a symmetrical mirror image. Instead, as depicted in FIG. 16, seats 1610 can be arranged in a staggered herringbone pattern.

Figure 17:
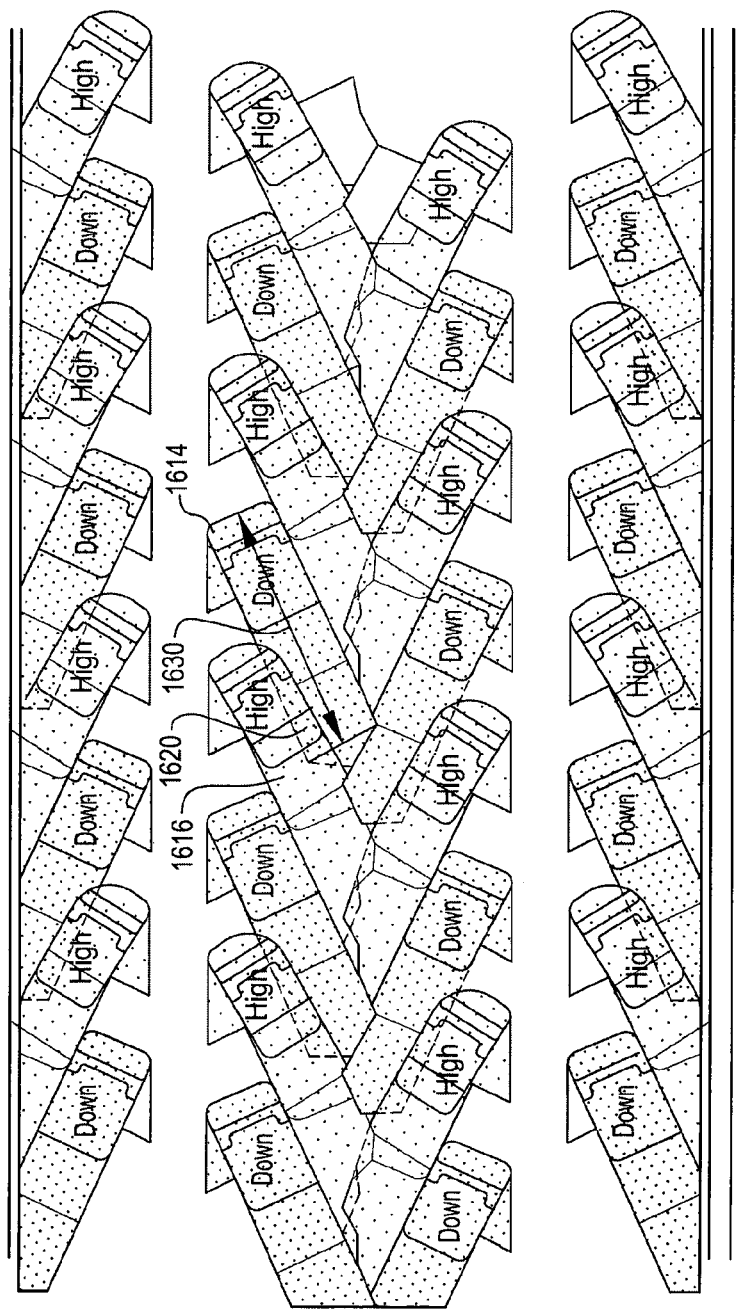
FIG. 17 is a top perspective view of an aircraft cabin having the alternate fourth arrangement of seats and sleeping surfaces showing relative vertical positioning of sleeping surfaces in accordance with embodiments.

FIG. 17 is a top perspective view of an aircraft cabin having the alternate fourth arrangement 1602 of seats and sleeping surfaces showing relative vertical positioning of sleeping surfaces in accordance with embodiments. As depicted in FIG. 17, a vertically overlapping staggered herringbone pattern can utilize sleeping surfaces having shapes different from the sleeping surface shapes utilized in a vertically overlapping symmetrical herringbone pattern. For example, when compared to a symmetrical lower sleeping surface 1414 depicted in FIG. 15, a staggered lower sleeping surface 1614 depicted in FIG. 17 can have a different geometry. Staggered lower sleeping surface 1614 can have a length 1630 representative of how far the staggered lower sleeping surface 1614 extends inward before its width begins to taper to accommodate the geometry of horizontally adjacent sleeping surfaces. Positioning the staggered lower sleeping surface 1614 so that a portion 1620 vertically overlaps with an adjacent staggered high sleeping surface 1616 can allow staggered lower sleeping surface 1614 to extend at an untapered width below staggered high sleeping surface 1616, thereby extending a pretapering length 1630. Additionally, when compared to a pre-tapering length 1430 of the symmetrical lower sleeping surface 1414 depicted in FIG. 15, the pre-tapering length 1630 of the staggered lower sleeping surface 1614 can be greater. A greater pre-tapering length 1630 can provide additional comfort for passengers.

Figure 18:
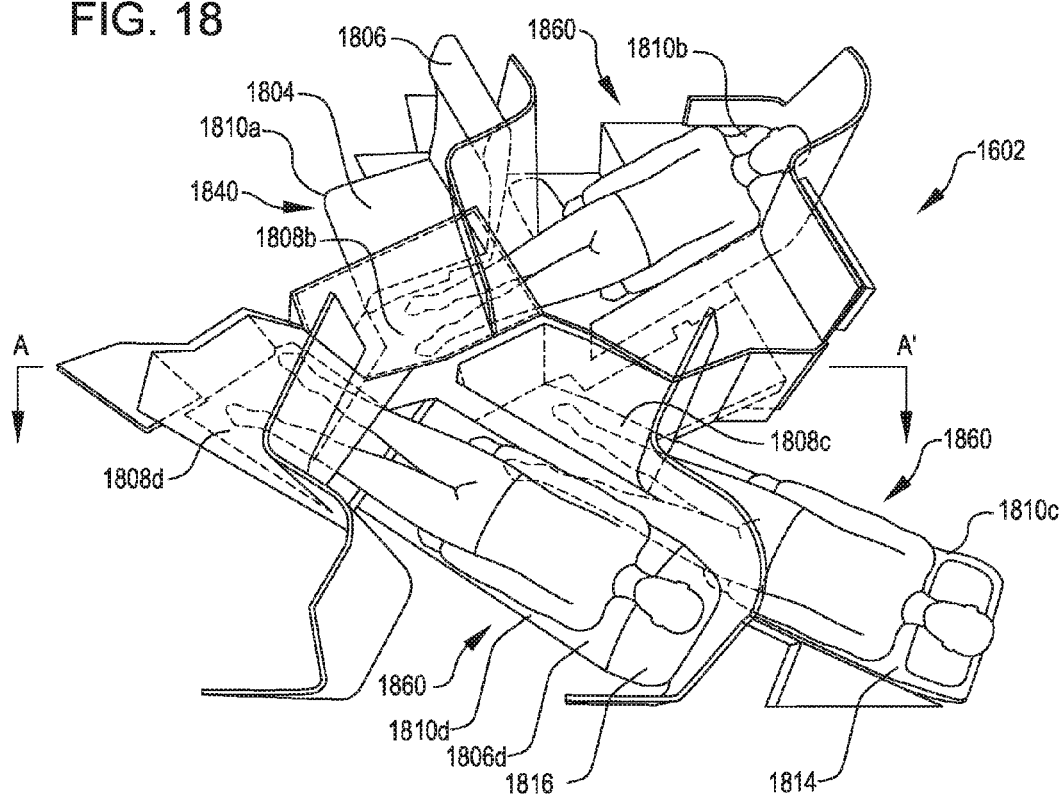
FIG. 18 is a top perspective view of a portion of the alternate fourth arrangement of seats and sleeping surfaces showing passengers positioned on sleeping surfaces in accordance with embodiments.

FIG. 18 is a top perspective view of a portion of the alternate fourth arrangement 1602 of seats and sleeping surfaces showing passengers positioned on sleeping surfaces in accordance with embodiments. As depicted in FIG. 18, the arrangement 1602 can include a number of seats 1810a-d. Each seat 1810a-d can include a seat pan 1804 and a seat back 1806. Seats 1810a-d can be convertible between a sitting mode 1840 and a bed mode 1860. For example, in FIG. 18, seat 1810a is depicted in sitting mode 1840, and seats 1810b-d are depicted in a bed mode 1860. As depicted in FIG. 18, in the sitting mode 1840, the seat 1810a may include a seat pan 1804a oriented substantially horizontally and a seat back 1806a oriented substantially vertically so that the seat 1810a is configured to accommodate a passenger in an upright seated position. In the bed mode 1860, the seat 1810b-d can be positioned proximate a footwell 1808b-d so as to provide a sleeping surface 1814 or 1816 to accommodate a passenger in a prone position. As discussed regarding FIG. 13 above, the seat 1810c and the footwell 1808c can be positioned so as to provide a sleeping surface 1814 at a height lower than the height of a sleeping surface 1816 provided by the forward adjacent parallel seat 1810d and footwell 1808d. The difference in height can allow the vertical overlap described with reference to FIG. 13 above.

Figure 19:
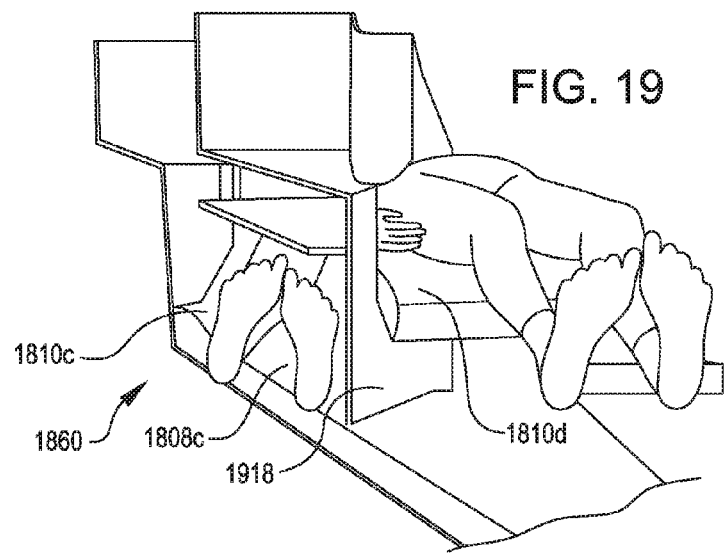
FIG. 19 is a section view of a portion of the alternate fourth arrangement of seats and sleeping surfaces showing relative vertical and horizontal positioning of sleeping surfaces adjacent in a column in accordance with embodiments.

FIG. 19 is a section view of a portion of the alternate fourth arrangement of seats and sleeping surfaces showing relative vertical and horizontal positioning of sleeping surfaces adjacent in a column in accordance with embodiments. The view depicted in FIG. 19 is taken approximately along the line A-A' depicted in FIG. 18. As depicted in FIG. 19, in bed mode 1860, a low seat 1810c can be positioned below the front high seat 1810d. The seat 1810c can be disposed at least partially within a footwell 1808c. The footwell 1808c can be defined in part by a boundary barrier 1918. As depicted in FIG. 19, the boundary barrier 1918 can be positioned beneath the front high seat 1810d. Accordingly, a portion of the footwell 1808c and/or of the low seat 1810c can be positioned beneath the front high seat 1810d so as to provide a vertical overlap between the low seat 1810c and the front high seat 1810d.

Figure 20:
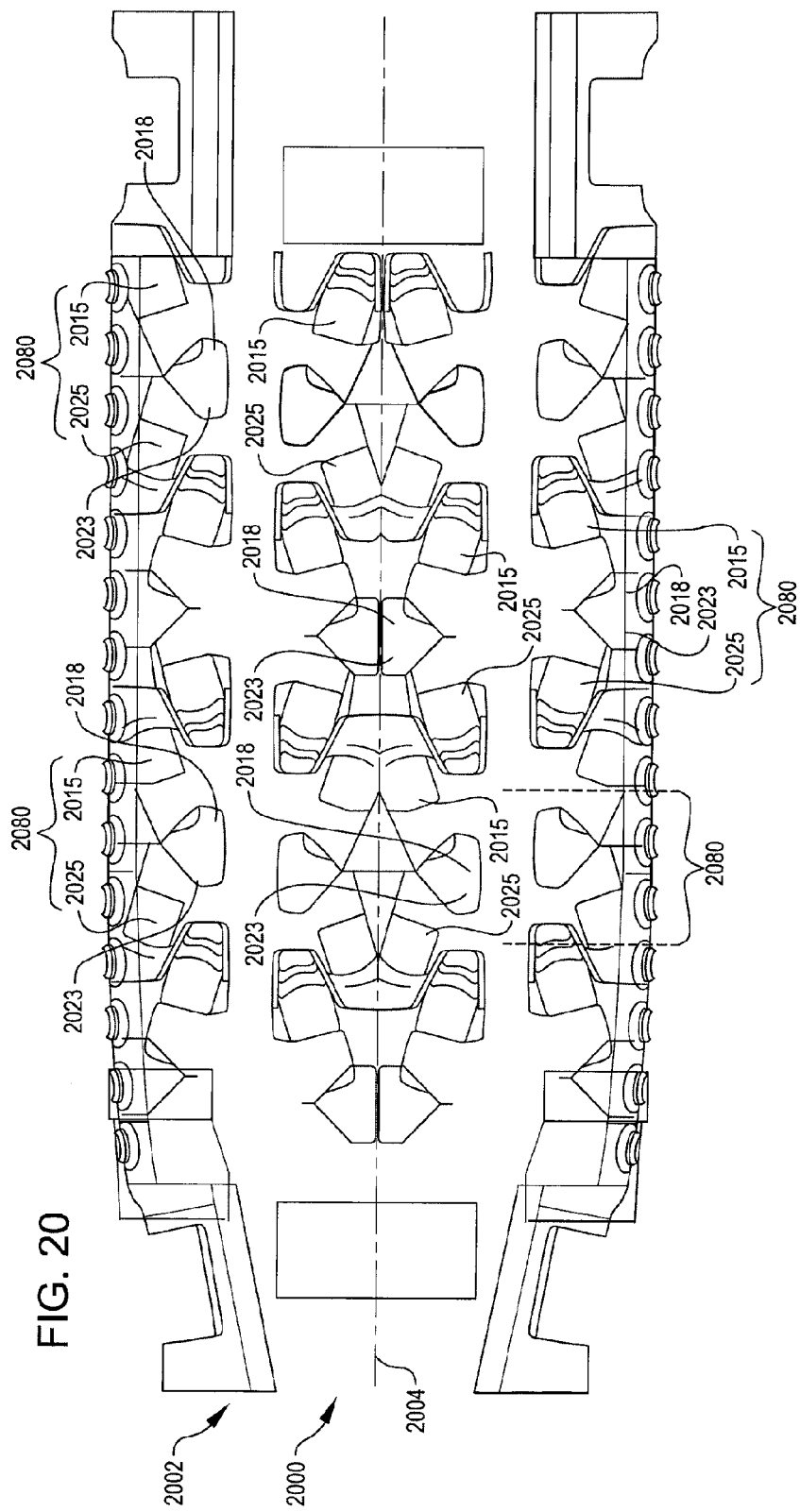
FIG. 20 is a top perspective view of an aircraft cabin having a fifth arrangement of seats and sleeping surfaces utilizing vertical overlap of footwells of sleeping surfaces adjacent in a column in accordance with embodiments.

FIG. 20 is a top perspective view of an aircraft cabin 2000 having a fifth arrangement 2002 of seats and sleeping surfaces utilizing vertical overlap of footwells of sleeping surfaces adjacent in a column in accordance with embodiments. The arrangement 2002 can have a plurality of seats 2015 and 2025. The seats 2015 and 2025 can be the seats 1310 described in greater detail with reference to FIG. 13 above. The seats 2015 and 2025 can be organized in pairs 2080 of contrary-facing seats. Each pair 2080 may include one forward facing seat 2015 and one backward facing seat 2025. Seats 2015 and 2025 may be positioned with the axis of each seat 2015 and 2025 shifted with respect to the axis 2004 of the vehicle. The axis of each forward facing seat 2015 can be shifted by the same amount as the other forward facing seats. The axis of each backward facing seat 2025 can be shifted by the same amount as the other backward facing seats. The axes of forward facing seats 2015 and the backward facing seats can be shifted by the same magnitude. The orientation of the axis of a particular seat may also differ from the orientation of seats of that type. Each pair 2080 can be configured so that the footwell 2018 of the backward facing seat vertically overlaps with the footwell 2023 of the forward facing seat as described further with respect to FIG. 15 above. This vertical overlap can provide space savings aboard the passenger vehicle.

Figure 21:
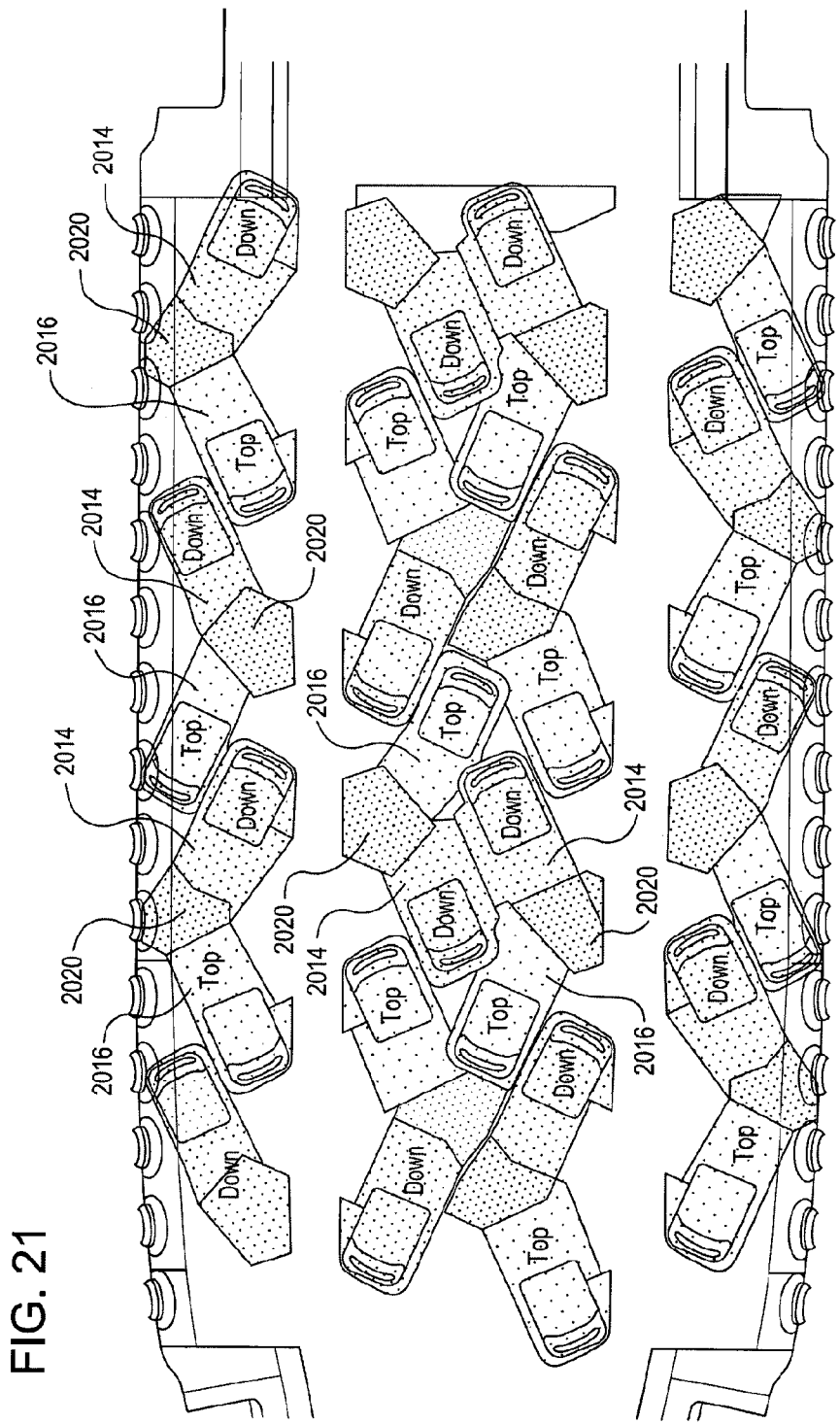
FIG. 21 is a top perspective view of a portion of the fifth arrangement of seats and sleeping surfaces showing relative vertical positioning of sleeping surfaces in accordance with embodiments.

FIG. 21 is a top perspective view of a portion of the fifth arrangement 2002 of seats and sleeping surfaces showing relative vertical positioning of sleeping surfaces in accordance with embodiments. As depicted in FIG. 21, the arrangement 2002 can include an alternating pattern including pairs 2080 of adjoining low sleeping surfaces 2014 and high sleeping surfaces 2016. Each sleeping surface in the alternating pattern of adjoining low sleeping surfaces 2014 and high sleeping surfaces 2016 can correspond to a seat 2015 or 2025, such as the seat 1310 as described with reference to FIG. 13 above. Low sleeping surfaces 2014 can be disposed at a height that is lower than the height at which the high sleeping surfaces 2016 are disposed. The difference in height between a low sleeping surface 2014 and an adjoining high sleeping surface 2016 can be provided by the use of some combination of high height seats 1000, standard height seats 1100, and low height seats 1200 described above with reference to FIG. 10A-12C. For example, a low height seat 1200 configured in a bed mode 1260 can be utilized to provide a low sleeping surface 2014, and either a standard height seat 1100 configured in a bed mode 1160 or a high height seat 1000 configured in a bed mode 1260 can provide the adjoining high sleeping surface 2016. As another example, a standard height seat 1100 configured in a bed mode 1160 can be utilized to provide a low sleeping surface 2014, and a high height seat 1000 configured in a bed mode 1260 can provide the adjoining high sleeping surface 2016.

Low sleeping surfaces 2014 can be positioned at least partially below the high sleeping surfaces 2016. A low sleeping surface 2014 can be disposed so that at least a portion 2020 of the low sleeping surface 2014 overlaps vertically with at least part of the high sleeping surface 2016 positioned adjoining the low sleeping surface 2014.

Figure 22:
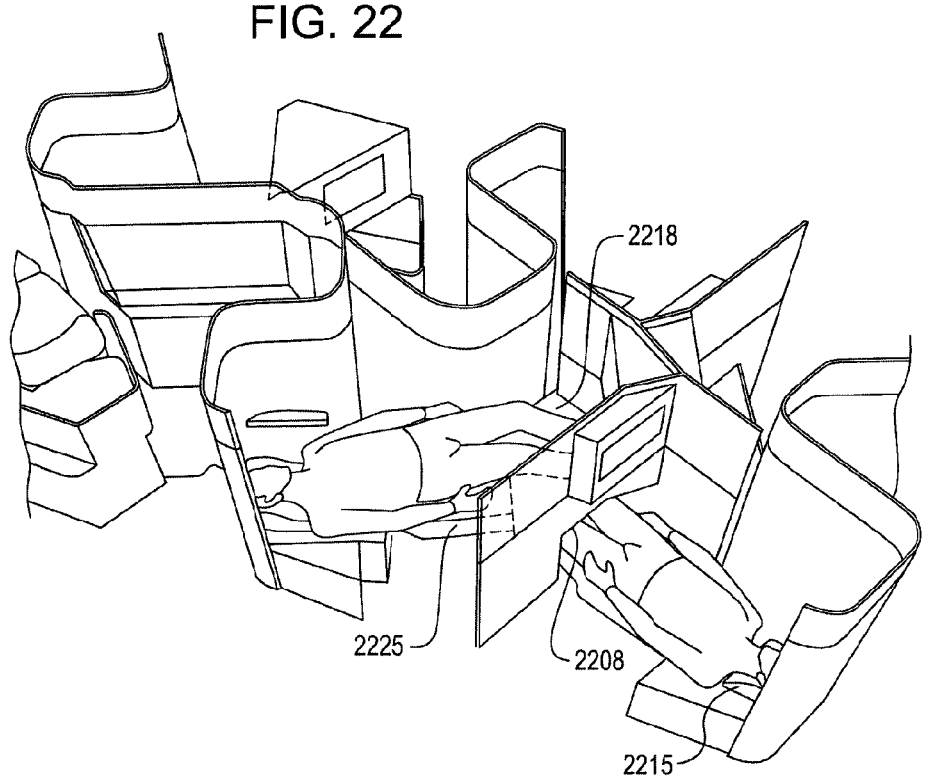
FIG. 22 is a top perspective view of a portion of the fifth arrangement of seats and sleeping surfaces showing passengers positioned on sleeping surfaces in accordance with embodiments.

FIG. 22 is a top perspective view of a portion of the fifth arrangement of seats and sleeping surfaces showing passengers positioned on sleeping surfaces in accordance with embodiments. As depicted in FIG. 22, a footwell 2208 of a backward facing seat 2215 can be disposed beneath a footwell 2218 of a forward facing seat 2225. The vertical overlap can provide space savings aboard the passenger craft and comfort for passengers.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A passenger accommodation assembly for a passenger vehicle, the accommodation assembly configured as a column of at least two passenger seats, the column oriented parallel to an axis defining a forward and a backward direction, the column comprising at least:

a first seat oriented to face toward the axis in a first direction not substantially parallel to the axis, the first seat convertible by a relative movement of elements of the first seat between a first sitting mode configured to support an occupant of the first seat in an upright seated position and a first bed mode in which elements of the first seat form at least part of a first sleeping surface configured to support an occupant of the first seat in a substantially prone position;

a second seat positioned behind the first seat in a direction parallel the backward direction, the second seat oriented to face toward the axis in a second direction not substantially parallel to the axis, the second seat convertible by a relative movement of elements of the second seat between a second sitting mode configured to support an occupant of the second seat in an upright seated position and a second bed mode in which elements of the second seat form at least part of a second sleeping surface configured to support an occupant of the second seat in a substantially prone position, wherein when the first seat is in the first bed mode, the first sleeping surface is situated at a first height relative to a reference surface, wherein when the second seat is in the second bed mode, the second sleeping surface is situated at a second height relative to the reference surface, wherein the second height is different from the first height such that at least a portion of the second sleeping surface vertically overlaps with at least a portion of the first sleeping surface when the first seat is in the first bed mode and the second seat is in the second bed mode.

2. The passenger accommodation assembly of claim 1, wherein the second direction in which the second seat is oriented to face is substantially parallel to the first direction in which the first seat is oriented to face.

3. The passenger accommodation assembly of claim 1, wherein the first seat is oriented to face toward the backward direction of the axis and the second seat is oriented to face toward the forward direction of the axis.

4. The passenger accommodation assembly of claim 1, wherein the second sleeping surface is situated at a height relative to a reference surface that is lower than the height of the first sleeping surface relative to the reference surface such that at least a portion of the second sleeping is disposed beneath at least a portion of the first sleeping surface.

5. The passenger accommodation assembly of claim 1, further comprising a footwell space positioned adjacent the second seat when the second seat is in the second sitting mode, the footwell space positioned so that when the second seat is in the second bed mode, the footwell space forms at least a part of the second sleeping surface such that the portion of the second sleeping surface which vertically overlaps with at least a portion of the first sleeping surface comprises at least a portion of the footwell space.

6. A passenger accommodation assembly for a passenger vehicle, the passenger accommodation assembly comprising:
(A) a first passenger seat convertible between a first sitting mode and a first bed mode, the first seat including:
  (i) a first seat pan, the first seat pan configured in the first sitting mode to be positioned a first sitting height relative to a floor of the passenger vehicle; and
  (ii) a first seat back, the first seat back positioned in the first sitting mode in an upright position; and
  (iii) a first sleeping surface, wherein in the first bed mode, the first seat back is positioned in a reclined position so as to cooperate with the first seat pan to form at least part of the first sleeping surface;
(B) a second passenger seat positioned at least partially behind the first passenger seat, the second passenger seat convertible between a second sitting mode and a second bed mode, the second seat including:
  (i) a second seat pan, the second seat pan configured in the second sitting mode to be positioned a second sitting height relative to a floor of the passenger vehicle; and
  (ii) a second seat back, the second seat back positioned in the second sitting mode in an upright position; and
  (iii) a second sleeping surface, wherein in the second bed mode, the second seat back is positioned in a reclined position so as to cooperate with the second seat pan to form at least part of the second sleeping surface;
(C) a first footwell, wherein when the first passenger seat is in the first bed mode, at least a portion of the first sleeping surface is positioned within the first footwell at a first bed height relative to said floor; and
(D) a second footwell positioned to at least partially vertically overlap with the first footwell, wherein when the second passenger seat is in the second bed mode, at least a portion of the second sleeping surface is positioned within the second footwell at a second bed height relative to said floor different from said first bed height.

7. The passenger accommodation assembly of claim 6, wherein the first sitting height and the second sitting height are approximately equal.

8. The passenger accommodation assembly of claim 6, wherein the first bed height is greater than the first sitting height.

9. The passenger accommodation assembly of claim 6, wherein the second bed height is less than the second sitting height.

10. The passenger accommodation assembly of claim 6, wherein the first passenger seat and the second passenger seat are positioned in a column oriented parallel to an axis defining a forward and a backward direction, the second passenger seat being positioned behind the first seat in a direction parallel the backward direction, and wherein one of the first passenger seat or the second passenger seat is oriented to face toward the backward direction of the axis and the other of the first passenger seat or the second passenger seat is oriented to face toward the forward direction of the axis.

11. A passenger accommodation assembly for a passenger vehicle, the passenger accommodation assembly comprising:
(A) a first passenger seat convertible between a first sitting mode and a first bed mode, the first seat including:
  (i) a first seat pan, the first seat pan configured in the first sitting mode to be positioned at a first sitting height relative to a floor of the passenger vehicle; and
  (ii) a first seat back, the first seat back positioned in the first sitting mode in an upright position; and
  (iii) a first sleeping surface, wherein in the first bed mode, the first seat back is positioned in a reclined position so as to cooperate with the first seat pan to form at least part of the first sleeping surface;
(B) a second passenger seat convertible between a second sitting mode and a second bed mode, the second seat including:

(i) a second seat pan, the second seat pan configured in the second sitting mode to be positioned at a second sitting height relative to a floor of the passenger vehicle; and (ii) a second seat back, the second seat back positioned in the second sitting mode in an upright position; and (iii) a second sleeping surface, wherein in the second bed mode, the second seat back is positioned in a reclined position so as to cooperate with the second seat pan to form at least part of the second sleeping surface;

wherein the first passenger seat and the second passenger seat are positioned adjacent an axis defining a forward and a backward direction, the second passenger seat being positioned behind the first seat in a direction parallel the backward direction, the first seat being oriented to face toward one of the backward direction of the axis or the forward direction of the axis and the second passenger seat being oriented to face toward the same direction of the axis as the first seat; and wherein the second sleeping surface is situated at a height relative to a reference surface, the height being different from a height of the first sleeping surface relative to the reference surface such that at least a portion of the second sleeping surface vertically overlaps with at least a portion of the first sleeping surface.

12. The passenger accommodation assembly of claim 11, wherein the second seat is oriented to face in a direction parallel to the direction in which the first seat is oriented to face.

13. The passenger accommodation assembly of claim 11, wherein the second sleeping surface is situated at a height relative to a reference surface that is lower than the height of the first sleeping surface relative to the reference surface such that at least a portion of the second sleeping is disposed beneath at least a portion of the first sleeping surface.

14. The passenger accommodation assembly of claim 11, further comprising a footwell space positioned adjacent the second seat when the second seat is in the second sitting mode, the footwell space positioned so that when the second seat is in the second bed mode, the footwell space forms at least a part of the second sleeping surface such that the portion of the second sleeping surface which vertically overlaps with at least a portion of the first sleeping surface comprises at least a portion of the footwell space.

* * * * *